(12) United States Patent
Liu

(10) Patent No.: US 12,460,317 B2
(45) Date of Patent: Nov. 4, 2025

(54) GENETICALLY ENCODED, PHAGE-DISPLAYED CYCLIC PEPTIDE LIBRARY AND METHODS OF MAKING THE SAME

(71) Applicant: The Texas A&M University System, College Station, TX (US)

(72) Inventor: Wenshe Liu, College Station, TX (US)

(73) Assignee: The Texas A&M University System, College Station, TX (US)

( * ) Notice: Subject to any disclaimer, the term of this patent is extended or adjusted under 35 U.S.C. 154(b) by 811 days.

(21) Appl. No.: 17/606,938

(22) PCT Filed: May 20, 2019

(86) PCT No.: PCT/US2019/033046
§ 371 (c)(1),
(2) Date: Oct. 27, 2021

(87) PCT Pub. No.: WO2020/236146
PCT Pub. Date: Nov. 26, 2020

(65) Prior Publication Data
US 2023/0139680 A1    May 4, 2023

(51) Int. Cl.
*C40B 30/04* (2006.01)
*C12N 15/10* (2006.01)

(52) U.S. Cl.
CPC .......... *C40B 30/04* (2013.01); *C12N 15/1037* (2013.01)

(58) Field of Classification Search
None
See application file for complete search history.

(56) References Cited

U.S. PATENT DOCUMENTS

2003/0235852 A1    12/2003    Roberts et al.
2013/0078671 A1    3/2013    Liu
(Continued)

FOREIGN PATENT DOCUMENTS

CN    102174080 A    9/2011
WO    WO-2020/180971 A1    9/2020
WO    WO-2021137870 A1    7/2021

OTHER PUBLICATIONS

International Search Report and Written Opinion for PCT/US2019/033046, mailed Sep. 24, 2019.
(Continued)

*Primary Examiner* — Christian C Boesen
(74) *Attorney, Agent, or Firm* — Jackson Walker LLP

(57) ABSTRACT

Embodiments of the present disclosure pertain to methods of selecting cyclic peptides that bind to a target by transforming a phage display library with a plurality of nucleic acids into bacterial host cells, where the nucleic acids include phage coat protein genes with a combinatorial region that encodes at least one cysteine and at least one non-canonical amino acid. The transformation results in the production of phage particles with phage coat proteins where the cysteine and the non-canonical amino acid couple to one another to form a cyclic peptide library. Phage particles are then screened against the desired target to select bound cyclic peptides. Amino acid sequences of the selected cyclic peptides are then identified. Additional embodiments pertain to methods of constructing a phage display library that encodes the cyclic peptides. Further embodiments of the present disclosure pertain to the produced cyclic peptides, phage display libraries and phage particles.

7 Claims, 20 Drawing Sheets
Specification includes a Sequence Listing.

(56) References Cited

U.S. PATENT DOCUMENTS

| | | |
|---|---|---|
| 2013/0178394 A1 | 7/2013 | Suga et al. |
| 2013/0210673 A1 | 8/2013 | Daugherty et al. |
| 2014/0065226 A1 | 3/2014 | Brey et al. |
| 2016/0355552 A1 | 12/2016 | Fasan |
| 2018/0051276 A1 | 2/2018 | Urban |

OTHER PUBLICATIONS

Aimetti, A. et al.; On-resin Petide Macrocyclization Using Thiol-ene Click Chemistry; Chem Comm (Camb.), Apr. 8, 2010, vol. 46, pp. 4061-4063.

Ph.D.™ Phage Display Libraries: Instruction Manual, New England BioLabs, Inc.Jul. 31, 2016, pp. 1-44. Retrieved from Internet: http://ulab360.com/files/prod/manuals/201301/07/427554001.pdf.

Xu, P., et al.; Structural Principals in the Development of Cyclic Peptidic Enzyme Inhibitors; Int. J. Biol. Sci, Sep. 21, 2017, vol. 13, pp. 1222-1233.

Rondot, S., et al.; A Helper Phage to Improve Single-Chain Antibody Presentation in Phage Display; Nat. Biotechnol, Jan. 1, 2001, vol. 19, pp. 75-78.

Liu, H., et al.; An Efficient One-Step Site-Directed Deletion, Insertion, Single and Multiple-Site Plasmid Mutagenesis Protocol; BMC Biotechnol, Dec. 4, 2008, vol. 8, No. 91, p. 1-10.

Foster, A. et al.; Methods for the Creation of Cyclic Peptide Libraries for Use in Lead Discovery; J Biomol Screen, Jan. 13, 2015, vol. 20, pp. 563-576.

Kharkar, P et al.; Thiol-ene Click Hydrogels for Therapeutic Delivery; ACS Biomater Sci Eng, Jan. 11, 2016, vol. 2, No. 2, pp. 165-179.

Goto Yuki et al; "Reprogramming the translation initiation for the synthesis of physiologically stable cyclic peptides"; ACS Chemical Biology, vol. 3, No. 2, Feb. 15, 2008, pp. 120-129.

Florian P. Seebeck et al; "Artificial lantipeptides from in vitro translations"; Chemical Communications, vol. 47, No. 21, Apr. 28, 2011, pp. 6141-6143.

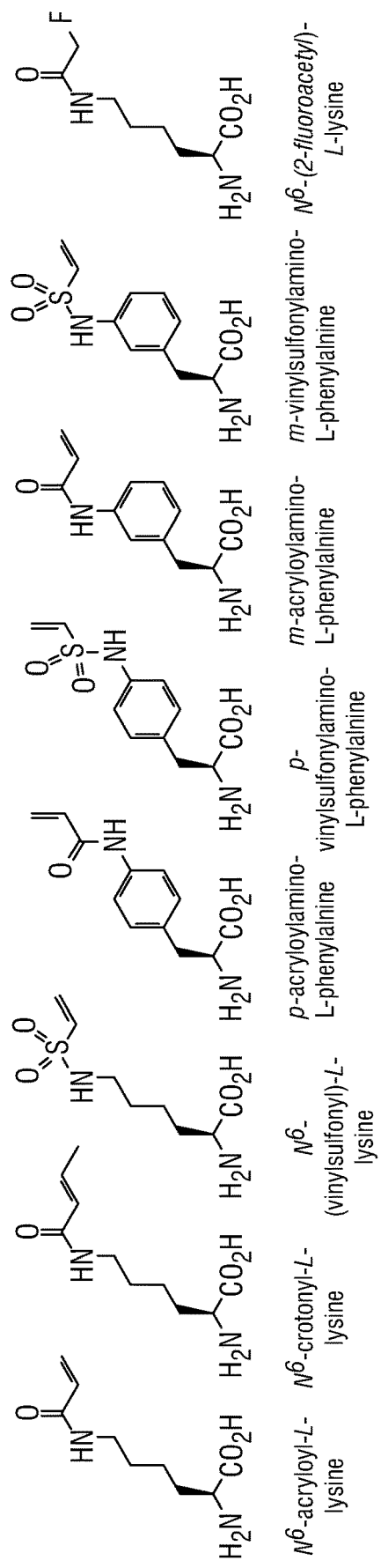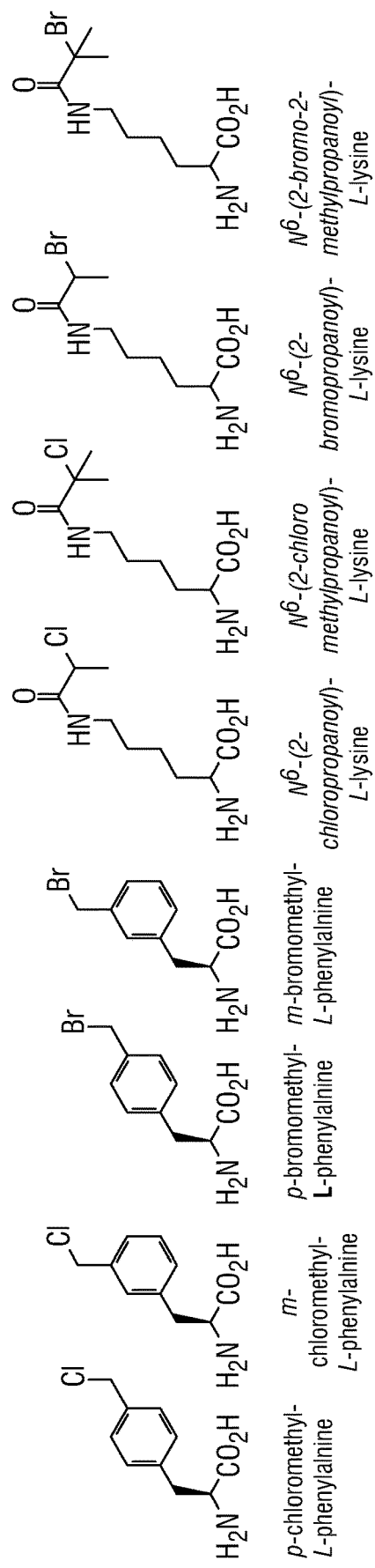
FIG. 2C

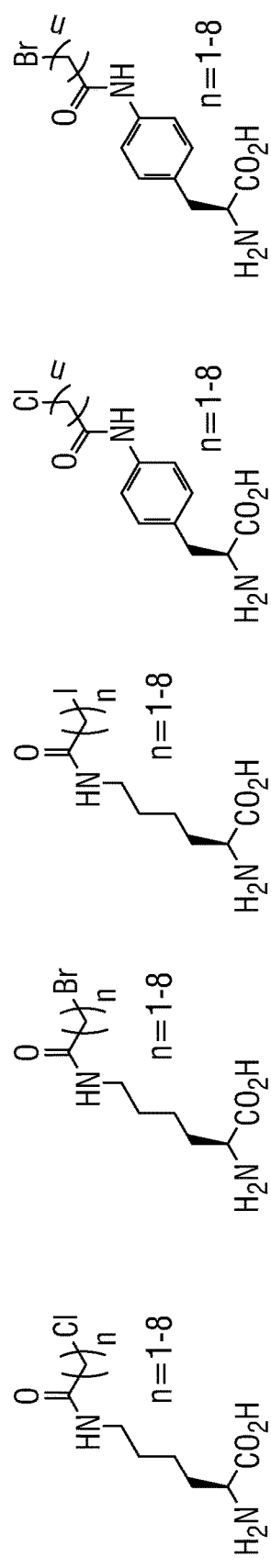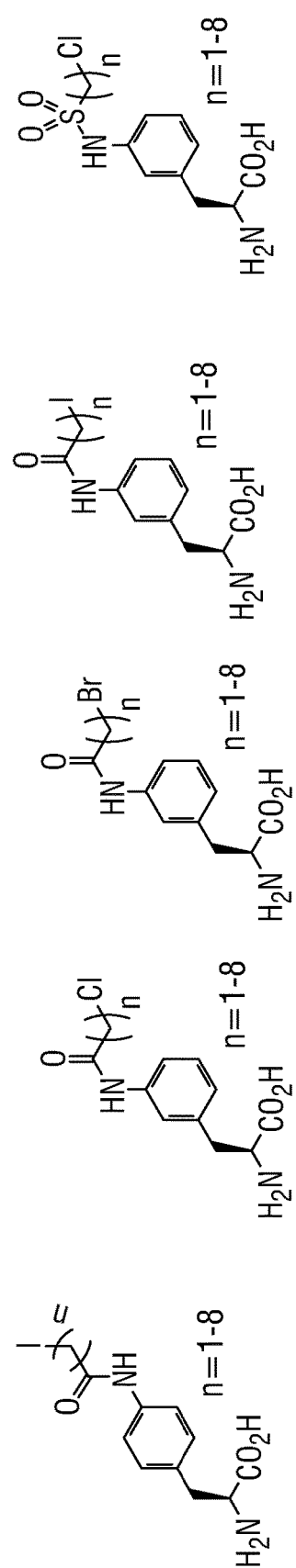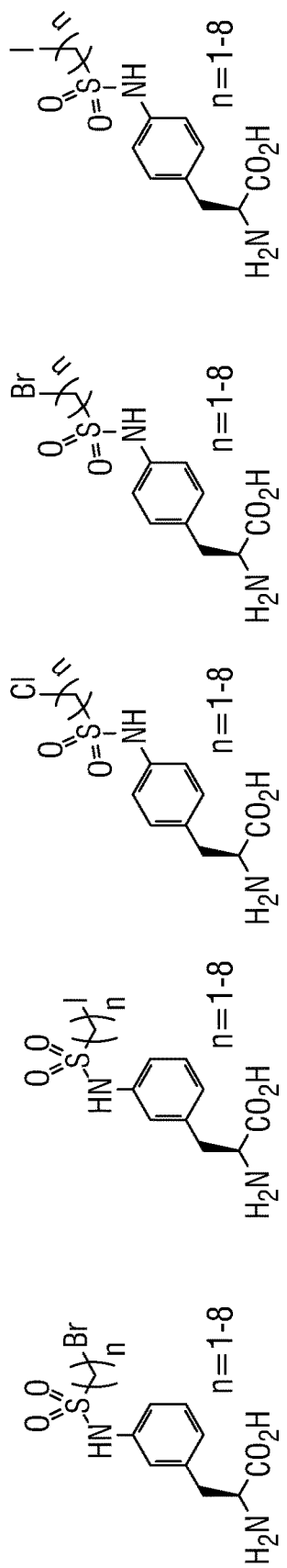
FIG. 2D

```
ATGGCTGCNNKNNKNNKNNKNNKTAGGGCCC    SEQ ID NO: 26
ATGGCCTGC|TTGTGTTTGCCGATTACG|TAGGGCCC   SEQ ID NO: 27
ATGGCCTGC|GCGCGTCCGGTTTGTAGT|TAGGGCCC   SEQ ID NO: 28
ATGGCCTGC|TTTCCGGTGTTTTCGGGT|TAGGGCCC   SEQ ID NO: 29
ATGGCCTGC|CCTTCGGCTACGATTGAT|TAGGGCCC   SEQ ID NO: 30
ATGGCCTGC|GATAGGGTAGTGGGACT|TAGGGCCC    SEQ ID NO: 31
ATGGCCTGC|TTTGGTAAGTAGTGGTGT|TAGGGCCC   SEQ ID NO: 32
ATGGCCTGC|TTGTCTCGGACTAGTGAG|TAGGGCCC   SEQ ID NO: 33
ATGGCCTGC|GTTCTTACTAGGGTGCCG|TAGGGCCC   SEQ ID NO: 34
ATGGCCTGC|CCTGGTCATCGGGTTTGG|TAGGGCCC   SEQ ID NO: 35
ATGGCCTGC|CTGGGTGTTACTCATGCG|TAGGGCCC   SEQ ID NO: 36
ATGGCCTGC|CTTGTTTATATTTGGGGT|TAGGGCCC   SEQ ID NO: 37
ATGGCCTGC|GTGGGTCGTTAGCGGTAT|TAGGGCCC   SEQ ID NO: 38
ATGGCCTGC|TTTAATGGGCATCCTTGG|TAGGGCCC   SEQ ID NO: 39
ATGGCCTGC|CTTGGTATTGTTTCGCCG|TAGGGCCC   SEQ ID NO: 40
ATGGCCTGC|TGTGTTATGGTGTGTTTG|TAGGGCCC   SEQ ID NO: 41
ATGGCCTGC|GTTAGGTATTCTGATGTT|TAGGGCCC   SEQ ID NO: 42
ATGGCC|GCGGCGAAAGCGGCC--------------------|GGCCC    SEQ ID NO: 43
ATGGC|-                        --------------------GGGG|TAGGGCCC   SEQ ID NO: 44
ATGGCC                TGC|T-TGGTGGTCTTGGGAGTT|A|GGCCC    SEQ ID NO: 45
ATGGCC|GCGGCGAAAGCGGCC--------------------|GGCCC    SEQ ID NO: 46
```

*FIG. 5*

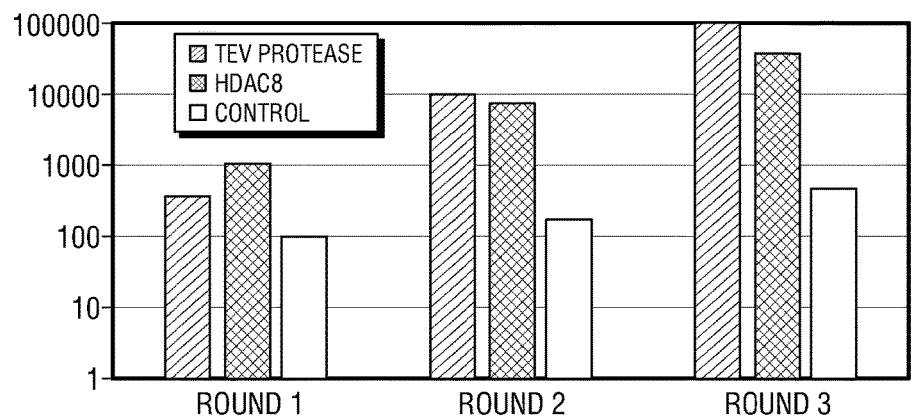

*FIG. 6*

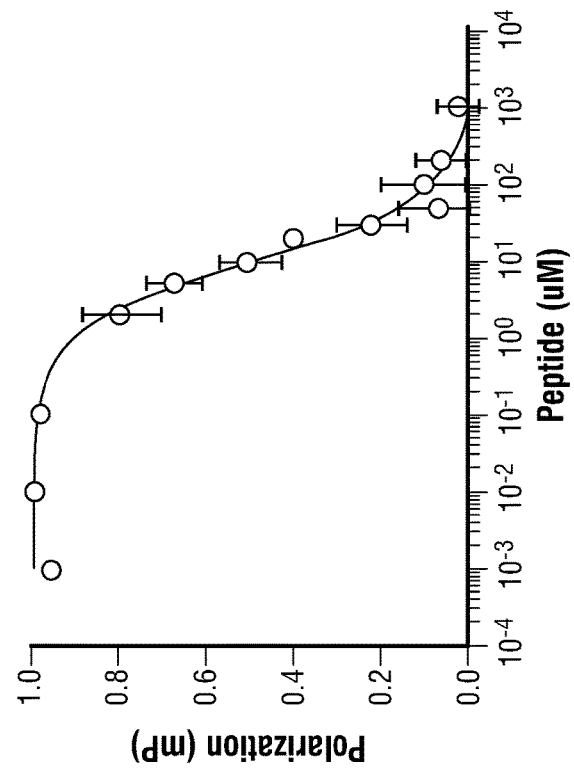
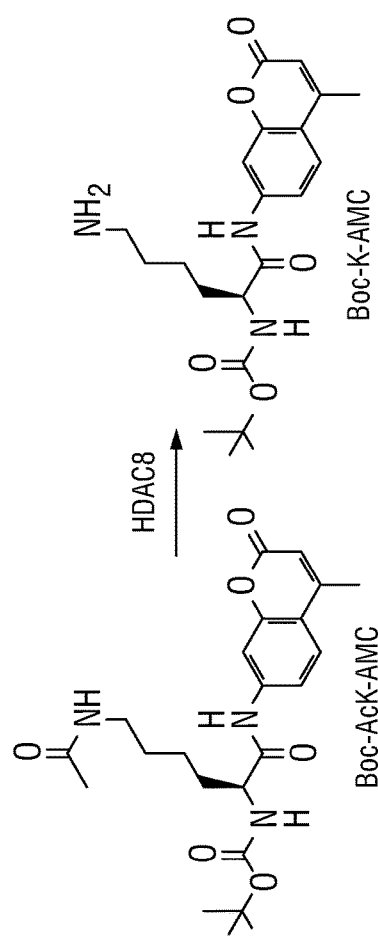
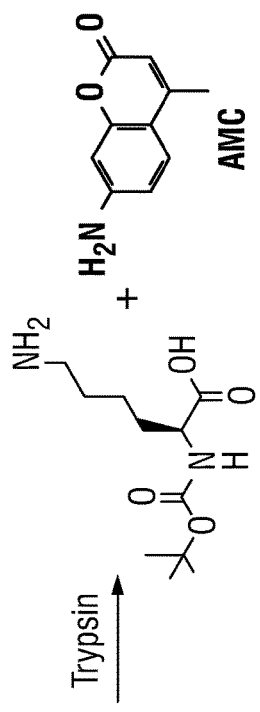
FIG. 9C
FIG. 9D

← TEV PROTEASE

GENETICALLY ENCODED, PHAGE-DISPLAYED CYCLIC PEPTIDE LIBRARY AND METHODS OF MAKING THE SAME

STATEMENT REGARDING FEDERALLY SPONSORED RESEARCH

This invention was made with government support under Grant No. R01CA161158 awarded by National Institutes of Health. The government has certain rights in the invention.

BACKGROUND

Cyclic peptides are considered to have potential use as therapeutic agents due to improved properties over their linear counterparts. In order to identify cyclic peptide ligands for therapeutic targets, selection from phage-displayed peptide libraries in which cysteines are conjugated covalently through either the disulfide bond or organic linkers has been widely adopted with great success. However, such methods have numerous technical drawbacks, such as limited use in vivo, and limited phage viability. Various embodiments of the present disclosure address the aforementioned limitations.

The development of this invention was funded in part by the Welch Foundation under grant number A-1715.

SUMMARY

In some embodiments, the present disclosure pertains to methods of selecting cyclic peptides that bind to a desired target. In some embodiments, the methods of the present disclosure include transforming a phage display library with a plurality of nucleic acids into bacterial host cells, where the nucleic acids include phage coat protein genes with a combinatorial region that encodes at least one cysteine and at least one non-canonical amino acid. The transformation results in the production of phage particles that contain phage coat proteins with the cysteine and the non-canonical amino acid coupled to one another to form cyclic peptides.

Thereafter, the phage particles are screened against the desired target to result in the selection of phage particles with cyclic peptides that bind to the desired target. The amino acid sequences of the cyclic peptides of the selected phage particles are then identified.

Additional embodiments of the present disclosure pertain to methods of constructing a phage display library that encodes cyclic peptides. In some embodiments, such methods include providing a naïve phage display library with nucleic acids that include phage coat protein genes with a combinatorial region, and introducing codons that express at least one cysteine and at least one non-canonical amino acid into the combinatorial region. Thereafter, the produced nucleic acids may be transformed into bacterial host cells to produce phage particles that contain phage coat proteins with the coupled cysteine and non-canonical amino acid in the combinatorial region.

Additional embodiments of the present disclosure pertain to phage display libraries that encode cyclic peptides in the combinatorial regions of phage coat proteins, where the cyclic peptides include at least one cysteine and at least one non-canonical amino acid in the combinatorial region that couple to one another to form cyclic peptides.

Further embodiments of the present disclosure pertain to phage particles that include cyclic peptides. The phage particles include phage coat proteins with a combinatorial region that includes at least one cysteine and at least one non-canonical amino acid that are coupled to one another to form a cyclic peptide.

Additional embodiments of the present disclosure pertain to cyclic peptides that include at least one cysteine and at least one non-canonical amino acid that are coupled to one another. In some embodiments, the cyclic peptides of the present disclosure inhibit an enzyme, such as TEV protease or HDAC8.

DESCRIPTION OF THE DRAWINGS

FIG. 1 illustrates representative, existing and proposed cyclization strategies for phage-displayed peptides.

FIG. 3 shows cyclization of phage-displayed peptides through Michael addition between a cysteine and a genetically incorporated $N^\varepsilon$-acryloyl-lysine (AcrK).

FIG. 4 shows selected TEV protease-binding cyclic peptides and their $K_d$ measurements.

FIG. 5 shows the sequences of 20 isolated clones from a phage display library.

FIG. 6 shows a number of eluted phages after each round of selection against TEV protease.

FIG. 9 shows a selected cyclic peptide ligand CycH8a and its binding and inhibition of HDAC8. FIG. 9C shows a diagram to show a fluorogenic HDAC8 activity assay scheme. FIG. 9D shows the $IC_{50}$ determination of 5FAM-CycH8a inhibition of HDAC8 using the assay shown in C.

DETAILED DESCRIPTION

Figure 1A:
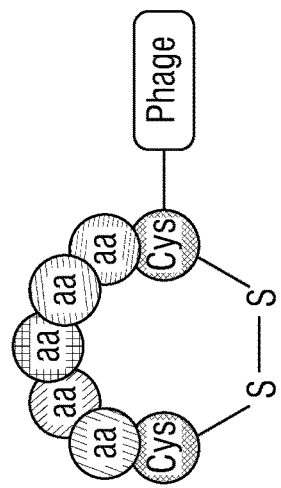
FIG. 1A shows cyclization through disulfide bonds between cysteines.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Traditionally, therapeutic drugs have consisted of small molecules that are exquisite at binding their receptors. However, due to their small size, small molecules have achieved little success at targeting proteins that involve large, relative flat, surfaces for interactions with other molecules. With the development of the recombinant protein expression technology, a new class of protein pharmaceuticals, dubbed as biologics, has emerged. Because of their larger sizes, biologics display far superior target affinity and selectivity compared to small molecules. However, their increased size and protein-based composition lead to poor tissue permeability and metabolic stability.

With their intermediate size between small molecules and biologics, peptides offer a promising alternative to the two established classes of pharmaceutics. Being larger than small molecules, peptides offer increased potency and target selectivity while maintaining a potential for cell permeability and a lower cost of manufacturing than biologics. Peptides are also extremely easy to screen. Using peptide display technologies, such as phage display, which link the displayed peptide phenotype to the genotype, it is possible for a single researcher to screen a library of greater than $10^{10}$ unique peptides in a matter of days. Despite these advantages, peptide-based inhibitors have long been avoided for two reasons.

First, peptides are generally unstructured in solution, which leads to an entropic penalty upon binding to a target. Second, peptides are highly susceptible to proteolysis when applied in vivo. It has long been known that macrocyclization can help to overcome some of the disadvantages of peptides.

Macrocyclization imparts a degree of conformational rigidity to an unstructured peptide, which often increases the binding affinity of the peptide for its target. Cyclic peptides are also significantly more resistant to proteolysis. In several cases, this has led to peptides so stable that they have been successfully used for oral delivery.

Although peptide cyclization generally leads to better pharmacological properties, cyclizing a linear peptide identified through screening can have unknown consequences on the ability of the peptide to bind to a target protein. At this time, there are exceedingly few options for directly screening cyclic peptide libraries.

Two methods have been reported for the cyclization of phage-displayed peptide libraries. One involves the formation of a disulfide bond between two cysteine residues (FIG. 1A). There are many examples about using this strategy to produce disulfide-cyclized peptides with higher affinity for a target protein than their linear counterparts. While beneficial for some in vitro applications, peptides cyclized in this way cannot be used in vivo as they cannot withstand the reducing cellular environments.

Figure 1B:
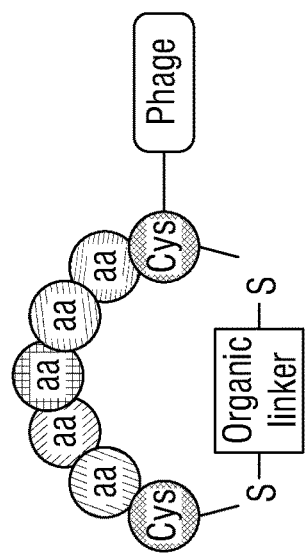
FIG. 1B shows cyclization through covalent conjugation of cysteines with organic linkers.
Figure 1C:
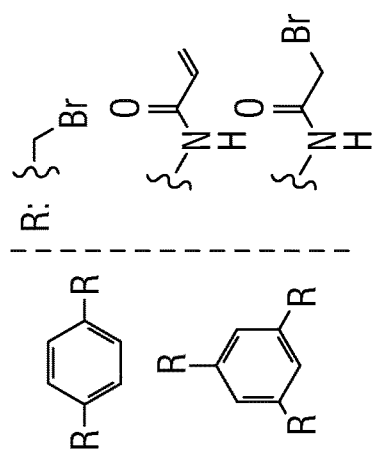
FIG. 1C shows representative organic linkers used for cysteine conjugation to generate mono- and bicyclic peptides.

An alternative strategy relies on the reactivity of nucleophilic thiols towards small-molecule organic linkers to covalently connect two cysteines (FIG. 1B). This strategy has been successfully used for the formation of both mono- and bicyclic, phage-displayed peptide libraries and used to select ligands with inhibition constants as low as 2 nM (FIG. 1C). Although effective at forming cyclized peptide libraries, this method modifies native phage cysteines leading to low phage viability.

Attempts have been made to construct phage strains with no surface cysteines. However, these phages have low viability, limiting the phage production. Due to the non-selective nature while conjugating cysteines, all current organic linkers are symmetric and achiral for avoiding heterogeneity in the phage-displayed cyclic peptides that poses significant challenges in the following synthesis and characterization of selected cyclic peptides. Symmetric, achiral organic linkers for cyclizing asymmetric, chiral peptides also lead to structural constrains that might not be desirable in certain circumstances.

As such, a need exists for more effective methods to produce cyclic peptides and screen them against desired targets. Various embodiments of the present disclosure address this need.

Figure 2A:
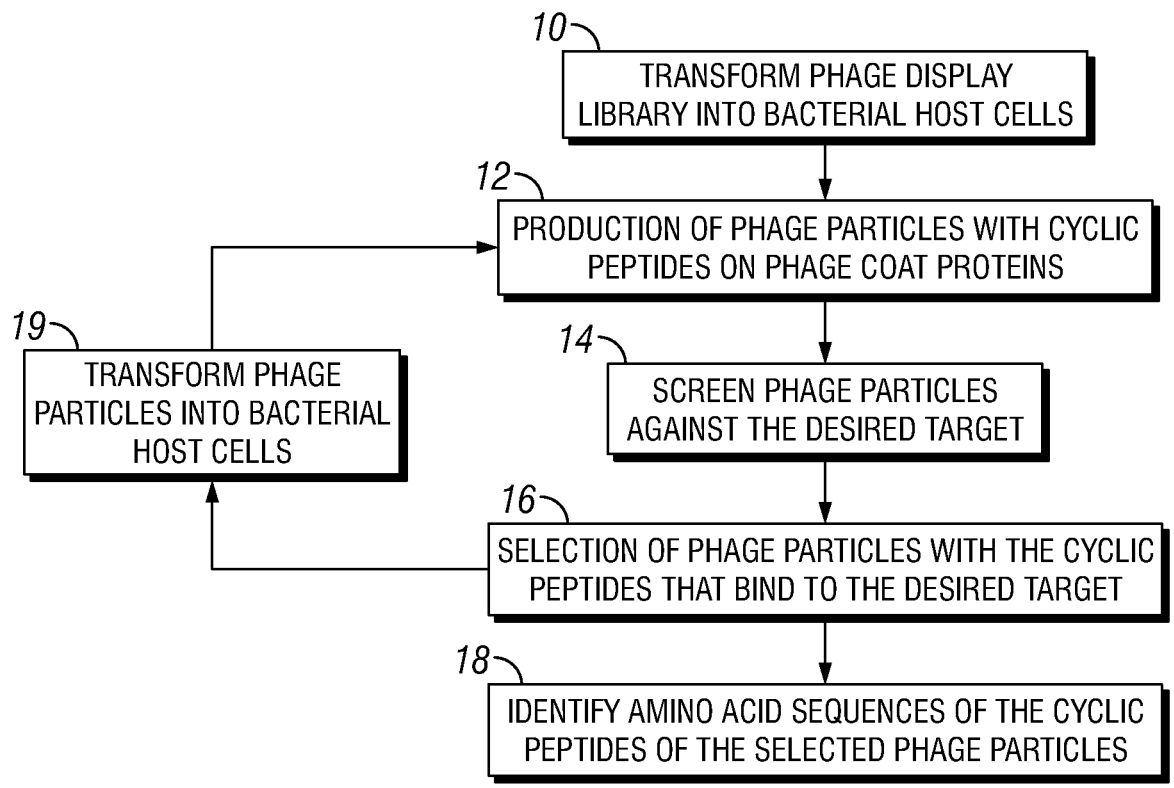
FIG. 2 provides schemes of methods of selecting cyclic peptides that bind to a desired target (FIG. 2A) and constructing a phage display library that encodes cyclic peptides (FIG. 2B).
FIGS. 2C and 2D provide structures of various non-canonical amino acids that could be incorporated into cyclic peptides.

In some embodiments, the present disclosure pertains to methods of selecting cyclic peptides that bind to a desired target. In some embodiments illustrated in FIG. 2A, the methods of the present disclosure include transforming a phage display library with a plurality of nucleic acids into bacterial host cells, where the nucleic acids include phage coat protein genes with a combinatorial region that encodes at least one cysteine and at least one non-canonical amino acid (step 10). The transformation results in the production of phage particles that contain phage coat proteins with the cysteine and the non-canonical amino acid coupled to one another to form cyclic peptides (step 12).

Thereafter, the phage particles are screened against the desired target (step 14) to result in the selection of phage particles with cyclic peptides that bind to the desired target (step 16). The amino acid sequences of the cyclic peptides of the selected phage particles are then identified (step 18).

In some embodiments, the screening includes a re-screening step, where the selected phage particles are transformed into the bacterial host cells (step 19) to allow for the production (step 12) and screening of additional phage particles (steps 14, 16, and 18). In some embodiments, the further screening is repeated multiple times.

Figure 2B:
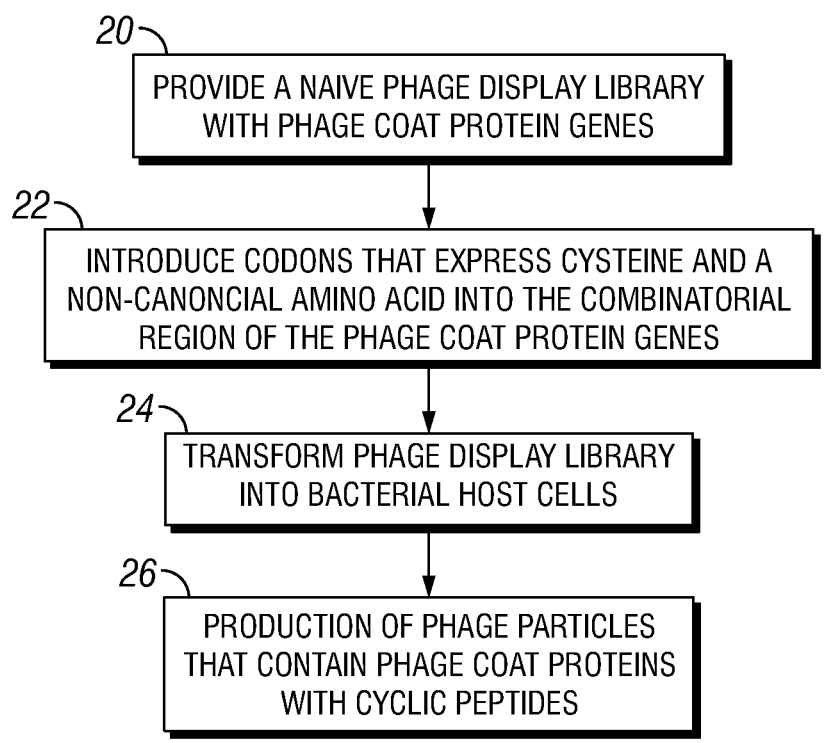

Additional embodiments of the present disclosure pertain to methods of constructing a phage display library that encodes cyclic peptides. In some embodiments illustrated in FIG. 2B, such methods include: providing a naïve phage display library with nucleic acids that include phage coat protein genes with a combinatorial region (step 20); and introducing at least one of a first codon that expresses a cysteine, and a second codon that expresses a non-canonical amino acid into the combinatorial region (step 22). In additional embodiments, phage particles that contain cyclic peptides are produced by transforming the phage display library into bacterial host cells (step 24) to produce phage particles that contain phage coat proteins with cyclic peptides (step 26).

Additional embodiments of the present disclosure pertain to phage display libraries that encode cyclic peptides. The phage display libraries include a plurality of nucleic acids with phage coat protein genes that include a combinatorial region with codons that express at least one cysteine and at least one non-canonical amino acid. The cysteine and the non-canonical amino acid in the combinatorial region couple to one another to form a cyclic peptide.

Figure 1D:
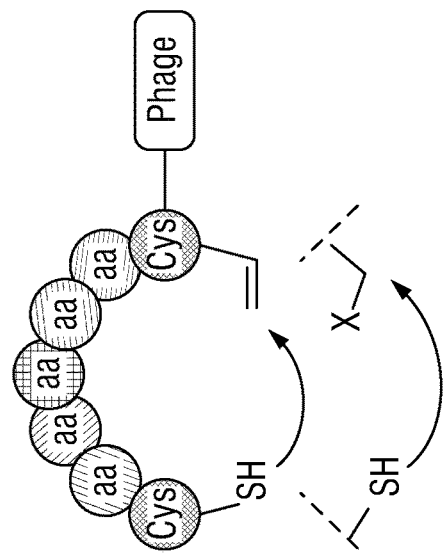
FIG. 1D shows proposed proximity-driven cyclization between a cysteine and an electrophilic non-canonical amino acid (ncAA).
Figure 1E:
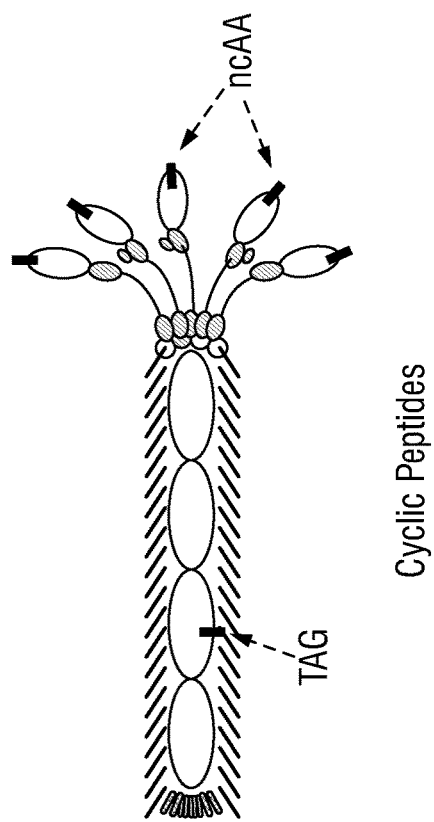
FIG. 1E shows an amber suppression-based approach to link the phenotypic ncAA with the genotypic TAG mutation. The production of a phage with a TAG mutation at the coding region of its displayed peptide is produced in $E.\ coli$ cells that harbor an evolved aminoacyl-tRNA synthetase and amber suppressing tRNA for the genetic incorporation of the designated ncAA.

Further embodiments of the present disclosure pertain to phage particles that include cyclic peptides (e.g., the phage particles illustrated in FIG. 1E). The phage particles include phage coat proteins with a combinatorial region that includes at least one cysteine and at least one non-canonical amino acid that are coupled to one another to form a cyclic peptide.

Further embodiments of the present disclosure pertain to cyclic peptides that include at least one cysteine and at least one non-canonical amino acid that are coupled to one another. In some embodiments, the cyclic peptides of the present disclosure inhibit an enzyme, such as TEV protease or HDAC8.

As set forth in more detail herein, the methods, cyclic peptides, phage display libraries, and phage particles of the present disclosure can have numerous embodiments. In particular, various methods may be utilized to select cyclic peptides. Moreover, various methods may be utilized to construct various phage display libraries that encode various cyclic peptides. Furthermore, the phage display libraries, phage particles, and cyclic peptides may encode and contain various types of non-canonical amino acids.

Nucleic Acids

The phage display libraries of the present disclosure can include various types of nucleic acids. For instance, in some embodiments, the nucleic acids are in the form of phagemids. In some embodiments, the nucleic acids are encapsulated in a phage.

Phage Coat Protein Genes

The cyclic peptides of the present disclosure may be encoded by the combinatorial regions of various phage coat protein genes. For instance, in some embodiments, the phage coat protein gene is the PIII gene.

Various methods may be utilized to introduce cysteine and non-canonical amino acids into combinatorial regions of phage coat protein genes. For instance, in some embodiments, the introduction occurs by site-directed mutagenesis.

In some embodiments, at least one of a first codon that expresses a cysteine and a second codon that expresses a non-canonical amino acid are introduced into the combinatorial region. In some embodiments (e.g., embodiments where the combinatorial region already contains a codon that expresses a non-canonical amino acid), only a first codon that expresses a cysteine is introduced into the combinatorial region. In some embodiments (e.g., embodiments where the combinatorial region already contains a codon that expresses a cysteine), only a second codon that expresses a non-canonical amino acid is introduced into the combinatorial region. In some embodiments (e.g., embodiments where the combinatorial region does not contain codons that express a cysteine or a non-canonical amino acid), a first codon that expresses a cysteine and a second codon that expresses a non-canonical amino acid are introduced into the combinatorial region.

In some embodiments, the phage coat protein gene is positioned near an IPTG-inducible promoter. As such, in some embodiments, the phage coat protein is expressed by exposing the bacterial host cells to IPTG.

Screening of Phage Particles Against Desired Targets

The cyclic peptide selection methods of the present disclosure can utilize various methods to screen phage particles against desired targets. For instance, in some embodiments, the screening occurs by affinity selection against the desired target. In some embodiments, the screening occurs by: (a) incubating the phage particles with a desired target that is immobilized on a surface; (b) separating unbound phage particles from phage particles that are bound to the desired target; and (c) isolating the bound phage particles. In some embodiments, the separation step may occur by washing away unbound phage particles from phage particles that are bound to the desired target.

In some embodiments, the desired target may be biotinylated and immobilized on a streptavidin surface. In some of such embodiments, screening may occur by (1) incubating the phage particles with the desired target that is immobilized on the streptavidin surface; (2) separating unbound phage particles from phage particles that are bound to the desired target by a washing step; and (3) isolating the bound phage particles by competitively eluting the bound phage particles with biotin, or by adding an acidic buffer (e.g., at pH 2) to release the bound phage particles.

In some embodiments, the screening results in the selection of phage particles with cyclic peptides that bind to a ligand binding site of the desired target. In some embodiments, the cyclic peptides act as ligands to direct the phage coat combinatorial region to the ligand binding site of the desired target.

Identifying Cyclic Peptide Amino Acid Sequences

The cyclic peptide selection methods of the present disclosure can also utilize various methods to identify cyclic peptide amino acid sequences. For instance, in some embodiments, the identification occurs by sequencing the combinatorial regions of the selected phage particles. In some embodiments, the identification occurs by: (a) purifying the selected phage particles; (b) isolating the nucleic acids from the selected phage particles; and (c) sequencing the combinatorial regions of the nucleic acids.

Bacterial Host Cells

The methods of the present disclosure can utilize various types of bacterial host cells to produce phage particles. In some embodiments, the bacterial host cells of the present disclosure are capable of translating the combinatorial region of the phage coat protein gene. In some embodiments, the bacterial host cells are co-infected with a knock-out helper phage that does not express the phage coat protein gene. In some embodiments, the helper phage is a CM13 helper phage. In some embodiments, the bacterial host cells include $E.\ coli$ bearing an F sex pilus.

In some embodiments (e.g., embodiments where the at least one non-canonical amino acid is encoded by at least one in-frame amber codon), the bacterial host cells include amber-suppressing bacterial host strains. In some embodiments, the bacterial host cells contain an amber suppressor tRNA that has been aminoacylated with the encoded non-canonical amino acid by a cognate aminoacyl-tRNA synthetase.

In more specific embodiments, the bacterial host cells are bacteria that have been transformed with three plasmids: (1) a plasmid that encodes a phage coat protein gene with at least one in-frame amber codon in a combinatorial region; (2) a plasmid that encodes an amber suppressor tRNA and a cognate aminoacyl-tRNA synthetase that can link a desired non-canonical amino acid to the suppressor tRNA; and (3) a helper phage that encodes all the essential phage proteins except the phage coat protein containing the combinatorial region.

Cyclic Peptides

The cyclic peptides of the present disclosure generally include at least one non-canonical amino acid that is coupled to at least one cysteine. The cyclic peptides of the present disclosure can include various types of non-canonical amino acids. For instance, in some embodiments, the non-canonical amino acid includes an electrophilic moiety that is capable of reacting with the sulfur group of the cysteine in the cyclic peptide.

In some embodiments, the non-canonical amino acid includes, without limitation, phenylalanine-derived non-canonical amino acids, lysine-derived non-canonical amino acids, and combinations thereof.

In some embodiments, the at least one non-canonical amino acid includes, without limitation, an alkene-containing non-canonical amino acid, an alkyne-containing non-canonical amino acid, an alkyl halide-containing non-canonical amino acid, and combinations thereof.

In some embodiments, the at least one non-canonical amino acid includes an alkene-containing non-canonical amino acid. In some embodiments, the alkenes include electron deficient alkenes.

In some embodiments, the at least one non-canonical amino acid includes an alkyne-containing non-canonical amino acid. In some embodiments, the alkynes include electron deficient alkynes.

In some embodiments, the at least one non-canonical amino acid includes an alkyl halide-containing non-canonical amino acid. In some embodiments, the alkyl halide-containing non-canonical amino acid includes, without limitation, chlorides, bromides, iodides, and combinations thereof.

Exemplary structures of non-canonical amino acids are shown in FIGS. 2C-D. In some embodiments, the non-canonical amino acids include, without limitation, $N^6$-acryloyl-L-lysine, $N^6$-crotonyl-L-lysine, $N^6$-vinylsulfonyl-L-lysine, p-acryloylamino-L-phenylalanine, p-vinylsulfonylamino-L-phenylalanine, m-acryloylamino-L-phenylalanine, m-vinylsulfonylamino-L-phenylalanine, $N^6$-(2-fluoroacetyl)-L-lysine, p-chloromethyl-phenylalanine, m-chloromethyl-L-phenylalanine, p-bromomethyl-L-phenylalanine, m-bromomethyl-L-phenylalanine, $N^6$-(2-chloropropanoyl)-L-lysine, $N^6$-(2-chloro-2-methylpropanoyl)-L-lysine, $N^6$-(2-bromopropanoyl)-L-lysine, $N^6$-(2-bromo-2-methylpropanoyl)-L-lysine, $N^6$-(2-chloroacetyl)-L-lysine, $N^6$-(3-chloropropionyl)-L-lysine, $N^6$-(4-chlorobutyryl)-L-lysine, $N^6$-(5-chloropentanoyl)-L-lysine, $N^6$-(6-chlorohexanoyl)-L-lysine, $N^6$-(7-chloroheptanoyl)-L-lysine, $N^6$-(8-chlorooctanoyl)-L-lysine, $N^6$-(9-chlorononanoyl)-L-lysine, $N^6$-(2-bromoacetyl)-L-lysine, $N^6$-(3-bromopropionyl)-L-lysine, $N^6$-(4-bromobutyryl)-L-lysine, $N^6$-(5-bromopentanoyl)-L-lysine, $N^6$-(6-bromohexanoyl)-L-lysine, $N^6$-(7-bromoheptanoyl)-L-lysine, $N^6$-(8-bromooctanoyl)-L-lysine, $N^6$-(9-bromononanoyl)-L-lysine, $N^6$-(2-iodoacetyl)-L-lysine, $N^6$-(3-iodopropionyl)-L-lysine, $N^6$-(4-iodobutyryl)-L-lysine, $N^6$-(5-iodopentanoyl)-L-lysine, $N^6$-(6-iodohexanoyl)-L-lysine, $N^6$-(7-iodoheptanoyl)-L-lysine, $N^6$-(8-iodooctanoyl)-L-lysine, $N^6$-(9-iodononanoyl)-L-lysine, p-(2-chloroacetamido)-L-phenylalanine, p-(3-chloropropionamido)-L-phenylalanine, p-(4-chlorobutyramido)-L-phenylalanine, p-(5-chloropentanamido)-L-phenylalanine, p-(6-chlorohexanamido)-L-phenylalanine, p-(7-chloroheptanamido)-L-phenylalanine, p-(8-chlorooctanamido)-L-phenylalanine, p-(9-chlorononanamido)-L-phenylalanine, p-(2-bromoacetamido)-L-phenylalanine, p-(3-bromopropionamido)-L-phenylalanine, p-(4-bromobutyramido)-L-phenylalanine, p-(5-bromopentanamido)-L-phenylalanine, p-(6-bromohexanamido)-L-phenylalanine, p-(7-bromoheptanamido)-L-phenylalanine, p-(8-bromooctanamido)-L-phenylalanine, p-(9-bromononanamido)-L-phenylalanine, p-(2-iodoacetamido)-L-phenylalanine, p-(3-iodopropionamido)-L-phenylalanine, p-(4-iodobutyramido)-L-phenylalanine, p-(5-iodopentanamido)-L-phenylalanine, p-(6-iodohexanamido)-L-phenylalanine, p-(7-iodoheptanamido)-L-phenylalanine, p-(8-iodooctanamido)-L-phenylalanine, p-(9-iodononanamido)-L-phenylalanine, m-(2-chloroacetamino)-L-phenylalanine, m-(3-chloropropionamido)-L-phenylalanine, m-(4-chlorobutyramido)-L-phenylalanine, m-(5-chloropentanamido)-L-phenylalanine, m-(6-chlorohexanamido)-L-phenylalanine, m-(7-chloroheptanamido)-L-phenylalanine, m-(8-chlorooctanamido)-L-phenylalanine, m-(9-chlorononanamido)-L-phenylalanine, m-(2-bromoacetamino)-L-phenylalanine, m-(3-bromopropionamido)-L-phenylalanine, m-(4-bromobutyramido)-L-phenylalanine, m-(5-bromopentanamido)-L-phenylalanine, m-(6-bromohexanamido)-L-phenylalanine, m-(7-bromoheptanamido)-L-phenylalanine, m-(8-bromooctanamido)-L-phenylalanine, m-(9-bromononanamido)-L-phenylalanine, m-(2-iodoacetamido)-L-phenylalanine, m-(3-iodopropionamido)-L-phenylalanine, m-(4-iodobutyramido)-L-phenylalanine, m-(5-iodopentanamido)-L-phenylalanine, m-(6-iodohexanamido)-L-phenylalanine, m-(7-iodoheptanamido)-L-phenylalanine, m-(8-iodooctanamido)-L-phenylalanine, m-(9-iodononanamido)-L-phenylalanine, p-((chloromethyl)sulfonamido)-L-phenylalanine, p-((2-chloroethyl)sulfonamido)-L-phenylalanine, p-((3-chloropropyl)sulfonamido)-L-phenylalanine, p-((4-chlorobutyl)sulfonamido)-L-phenylalanine, p-((5-chloropentyl)sulfonamido)-L-phenylalanine, p-((6-chlorohexyl)sulfonamido)-L-phenylalanine, p-((7-chloroheptyl)sulfonamido)-L-phenylalanine, p-((8-chlorooctyl)sulfonamido)-L-phenylalanine, m-((chloromethyl) sulfonamido)-L-phenylalanine, m-((2-chloroethyl)sulfonamido)-L-phenylalanine, m-((3-chloropropyl)sulfonamido)-L-phenylalanine, m-((4-chlorobutyl)sulfonamido)-L-phenylalanine, m-((5-chloropentyl)sulfonamido)-L-phenylalanine, m-((6-chlorohexyl)sulfonamido)-L-phenylalanine, m-((7-chloroheptyl)sulfonamido)-L-phenylalanine, m-((8-chlorooctyl)sulfonamido)-L-phenylalanine, p-((bromomethyl)sulfonamido)-L-phenylalanine, p-((2-bromoethyl)sulfonamido)-L-phenylalanine, p-((3-bromopropyl)sulfonamido)-L-phenylalanine, p-((4-bromobutyl)sulfonamido)-L-phenylalanine, p-((5-bromopentyl)sulfonamido)-L-phenylalanine, p-((6-bromohexyl)sulfonamido)-L-phenylalanine, p-((7-bromoheptyl)sulfonamido)-L-phenylalanine, p-((8-bromooctyl)sulfonamido)-L-phenylalanine, p-((iodomethyl)sulfonamido)-L-phenylalanine, p-((2-iodoethyl)sulfonamido)-L-phenylalanine, p-((3-iodopropyl)sulfonamido)-L-phenylalanine, p-((4-iodobutyl)sulfonamido)-L-phenylalanine, p-((5-iodopentyl)sulfonamido)-L-phenylalanine, p-((6-iodohexyl)sulfonamido)-L-phenylalanine, p-((7-iodoheptyl)sulfonamido)-L-phenylalanine, p-((8-iodooctyl)sulfonamido)-L-phenylalanine, m-((bromomethyl)sulfonamido)-L-phenylalanine, m-((2-bromoethyl)sulfonamido)-L-phenylalanine, m-((3-bromopropyl)sulfonamido)-L-phenylalanine, m-((4-bromobutyl)sulfonamido)-L-phenylalanine, m-((5-bromopentyl)sulfonamido)-L-phenylalanine, m-((6-bromohexyl)sulfonamido)-L-phenylalanine, m-((7-bromoheptyl)sulfonamido)-L-phenylalanine, m-((8-bromooctyl)sulfonamido)-L-phenylalanine, m-((iodomethyl)sulfonamido)-L-phenylalanine, m-((2-iodoethyl)sulfonamido)-L-phenylalanine, m-((3-iodopropyl)sulfonamido)-L-phenylalanine, m-((4-iodobutyl)sulfonamido)-L-phenylalanine, m-((5-iodopentyl)sulfonamido)-L-phenylalanine, m-((6-iodohexyl)sulfonamido)-L-phenylalanine, m-((7-iodoheptyl)sulfonamido)-L-phenylalanine, m-((8-iodooctyl)sulfonamido)-L-phenylalanine, and combinations thereof.

In some embodiments, the non-canonical amino acid is $N^6$-acryloyllysine (AcrK). Additional non-canonical amino acids can also be envisioned.

The non-canonical amino acids of the present disclosure may be encoded by various codons. For instance, in some embodiments, the non-canonical amino acids are encoded by a codon that includes, without limitation, an in-frame amber codon, an in-frame ochre codon, an in-frame opal codon, a rare codon, and a four base codon.

In some embodiments, the non-canonical amino acids are encoded by an in-frame amber codon. In some embodiments, the non-canonical amino acids are encoded by a rare codon. In some embodiments, the rare codon is AGA. In some embodiments, the rare codon is AGG.

In some embodiments, the non-canonical amino acids are encoded by a four base codon. In some embodiments, the four base codon is AGGA.

In some embodiments, the non-canonical amino acids are encoded by a stop codon. In some embodiments, the stop codon includes an in-frame amber codon. In some embodiments, the stop codon includes an in-frame ochre codon. In some embodiments, the stop codon includes an in-frame opal codon.

The non-canonical amino acids and cysteines of the present disclosure may be located on various positions of a cyclic peptide or a phage coat protein combinatorial region. For instance, in some embodiments, the non-canonical amino acid is at one end of the combinatorial region or cyclic peptide and the cysteine is at the other end of the combinatorial region or cyclic peptide.

The non-canonical amino acid and the cysteine may be separated from one another in various manners. For instance, in some embodiments, the non-canonical amino acid and the cysteine are separated by at least 4 amino acids. In some embodiments, the non-canonical amino acid and the cysteine are separated by about 4-10 amino acids. In some embodiments, the non-canonical amino acid and the cysteine are separated by about 4-6 amino acids. In some embodiments, the non-canonical amino acid and the cysteine are separated by about 10 amino acids.

The non-canonical amino acids and cysteines of the present disclosure can couple to one another in various manners to form cyclic peptides. For instance, in some embodiments, the cysteines and non-canonical amino acids couple to one another by a Michael addition reaction between the cysteine and an electrophilic region of the non-canonical amino acid (e.g., the coupling reaction shown in FIG. 1D). In some embodiments, the cysteines and non-canonical amino acids couple to one another by a nucleophilic substitution reaction between the cysteine and an electrophilic region of the non-canonical amino acid. In some embodiments, the cysteine and the non-canonical amino acid couple to one another through covalent bonds. In some embodiments, the cysteine and the non-canonical amino acid couple to one another through bonds that exclude disulfide bonds.

Cyclic Peptide Targets

The cyclic peptides of the present disclosure may bind to and be selected against various desired targets. For instance, in some embodiments, the desired targets include, without limitation, peptides, proteins, enzymes, small molecules, cell receptors, antigens, ligand binding sites of a desired target, active sites of a desired target, active sites of a protein, allosteric sites of a protein, DNA, RNA, and combinations thereof.

In some embodiments, the desired target is an enzyme. In some embodiments, the cyclic peptides of the present disclosure inhibit the activity of the enzyme. In some embodiments, the enzyme includes, without limitation, proteases, histone deacetylases, and combinations thereof. In some embodiments, the enzyme is TEV protease. In some embodiments, the enzyme is HDAC8.

In some embodiments, the cyclic peptide is an inhibitor of TEV Protease. In some embodiments, the cyclic peptide inhibitor of TEV protease includes, without limitation, CWRDYLIX (CycTev1) (SEQ ID NO: 1), CQWFSHRX (CycTev2) (SEQ ID NO: 2), or combinations thereof, where X is a non-canonical amino acid that is coupled to the cysteine.

In some embodiments, the cyclic peptide is an inhibitor of HDAC8. In some embodiments, the cyclic peptide that is an inhibitor of HDAC8 is CQSLWMNX (CycH8a) (SEQ ID NO: 3), where X is a non-canonical amino acid that is coupled to the cysteine.

In some embodiments, the cyclic peptides of the present disclosure bind to a desired target with high affinities. For instance, in some embodiments, the cyclic peptides of the present disclosure bind to a desired target with affinities that are significantly better than their linear counterparts. In some embodiments, the cyclic peptides of the present disclosure bind to a desired target with a $K_d$ value that is at least 2 times lower than the $K_d$ value of its linear counterpart. In some embodiments, the cyclic peptides of the present disclosure bind to a desired target with a $K_d$ value that is at least 5 times lower than the $K_d$ value of its linear counterpart. In some embodiments, the cyclic peptides of the present disclosure bind to a desired target with a $K_d$ value that is at least 6 times lower than the $K_d$ value of its linear counterpart. In some embodiments, the cyclic peptides of the present disclosure bind to a desired target with a $K_d$ value that is at least 10 times lower than the $K_d$ value of its linear counterpart.

In some embodiments, the cyclic peptides of the present disclosure bind to a desired target with $K_d$ values of 10 μm or less. In some embodiments, the cyclic peptides of the present disclosure bind to a desired target with $K_d$ values of 5 μm or less. In some embodiments, the cyclic peptides of the present disclosure bind to a desired target with $K_d$ values of 1 μm or less. In some embodiments, the cyclic peptides of the present disclosure bind to a desired target with $K_d$ values of 500 nm or less.

Applications and Advantages

In some embodiments, the cyclic peptides formed by the methods of the present disclosure have enhanced affinity for a desired target. For instance, in some embodiments, the cyclic peptides of the present disclosure show a six-fold stronger affinity to their protein targets than their linear counterparts.

Furthermore, Applicants envision that the methods of the present disclosure will find broad applications in numerous fields, such as drug discovery. For instance, in some embodiments, the methods of the present disclosure can be used to select potent ligands for many therapeutic targets, such as surface receptors and enzymes.

Moreover, the methods of the present disclosure provide automatic processes that avoid chemical treatment used in traditional methods. Furthermore, in some embodiments, the phage particles of the present disclosure have higher viability in comparison to traditional methods.

Reference will now be made to more specific embodiments of the present disclosure and experimental results that provide support for such embodiments. However, Applicants note that the disclosure below is for illustrative purposes only and is not intended to limit the scope of the claimed subject matter in any way.

EXAMPLE 1

A Genetically Encoded, Phage-Displayed Cyclic Peptide Library

In this Example, Applicants describe a novel phage display technique in which its displayed peptides are cyclized through a proximity-driven Michael addition reaction between a cysteine and an amber codon-coded $N^\varepsilon$-acryloyl-lysine (AcrK). Using a randomized 6-mer library in which peptides were cyclized at two ends through a cysteine-AcrK linker, Applicants demonstrated the successful selection of potent ligands for TEV protease and HDAC8. All selected cyclic peptide ligands showed 6-folder stronger affinity to their protein targets than their linear counterparts.

More specifically, Applicants envisioned that an electrophilic non-canonical amino acid (ncAA) and a cysteine can be genetically installed in phage-displayed peptides in close proximity for peptide cyclization (FIG. 1D). The incorporation of the ncAA into phages can be achieved by suppressing an amber mutation in the phage-displayed peptide coding region in *E. coli* cells that harbor a ncAA-specific aminoacyl-tRNA synthetase-amber suppressor tRNA pair and grow in the presence of the ncAA (FIG. 1E). Using this new method for the construction of a phage display library will afford a genetically encoded phage-displayed cyclic peptide library whose spontaneous peptide cyclization requires neither the use of phage strains with no surface cysteines nor an organic linker for cyclization.

Pyrrolysine (Pyl) is a naturally occurring $22^{nd}$ proteinaceous amino acid that is genetically encoded by an amber codon. Its incorporation is mediated by pyrrolysyl-tRNA synthetase (PylRS) and $tRNA_{CUA}^{Pyl}$. In the past decade, a number of research groups have evolved PylRS for the genetic incorporation of more than 100 ncAAs, including both lysine and phenylalanine derivatives into proteins in *E. coli*. One of these ncAAs is $N^\varepsilon$-acryloyl-lysine (AcrK), a Michael acceptor.

Applicants previously demonstrated that AcrK reacts slowly with a thiol (the second-order rate constant is 0.004 $M^{-1}s^{-1}$) at physiological conditions but can be stably incorporated into proteins in *E. coli* using an evolved PylRS mutant (PrKRS) and $tRNA_{CUA}^{Pyl}$. The slow reaction between AcrK and cysteine is desirable in that it avoids non-specific reactions with regular protein cysteines but allow rapid conjugation when AcrK and cysteine are located in close proximity in a peptide.

Figure 3A:
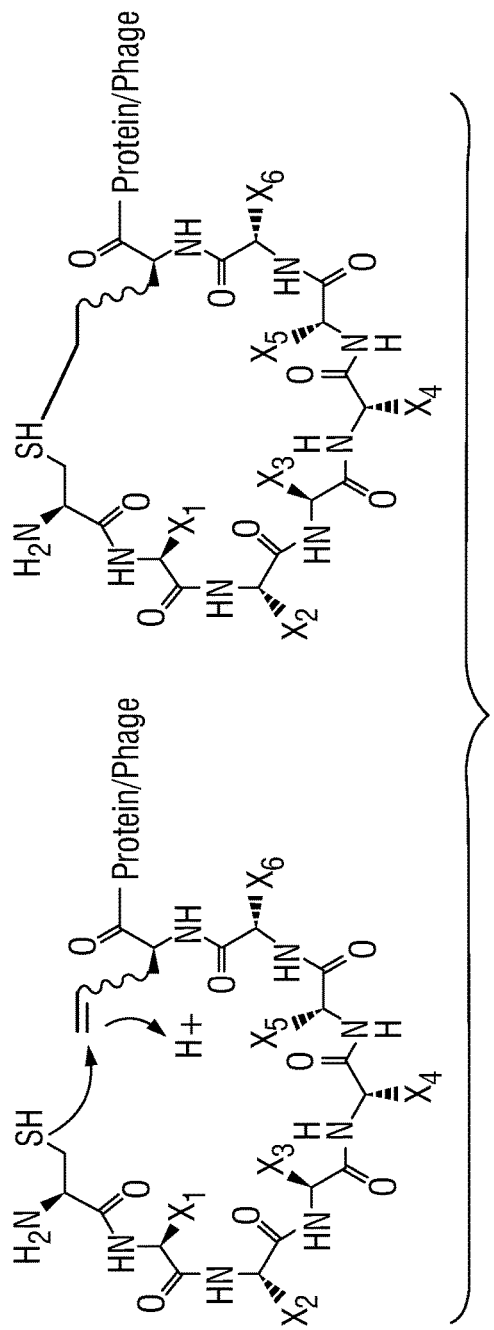
FIG. 3A shows a diagram that illustrates proximity-driven peptide cyclization between a cysteine and an electron deficient ncAA.
Figure 3B:
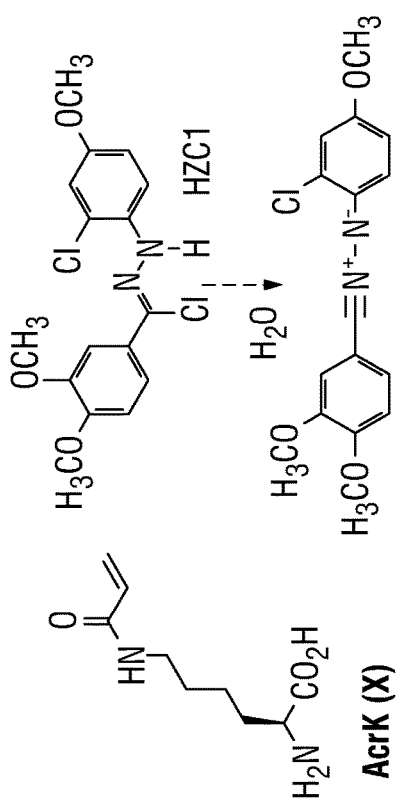
FIG. 3B shows the structure of AcrK and HZC1 whose dissociation product in water is a nitrilimine that reacts selectively with an acrylamide to show intense blue fluorescence.

By installing a cysteine and an AcrK at two ends of a phage displayed peptide, an automatic cyclization of the peptide is expected (FIG. 3A). There is also an advantage to work with AcrK. Its acrylamide moiety undergoes Huisgen 1,3-cycloaddition reaction selectively with a non-fluorescent diphenylnitrilimine moiety to form an intense blue fluorescent final product. Using HZC1 (FIG. 3B) that undergoes rapid dehydrocholoration in water to release a diphenylnitrile, protein or phage with intact AcrK can be easily labeled and visualized.

However, a proximity-driven Michael addition reaction between AcrK and cysteine in a peptide will annihilate the acrylamide moiety, leading to a cyclic peptide that cannot be labeled by HZC1. To demonstrate the proximity-driven cyclization between a genetically incorporated AcrK and an adjacent cysteine in a protein, Applicants expressed superfolder green fluorescent protein (sfGFP) that had a N-terminal CA$_5$X peptide (X denotes AcrK and is coded by an amber codon). To express this protein, Applicants transformed E. coli BL21(DE3) cells with two plasmids. One was a previously described pEVOL-PrKRS plasmid that contained both PrKRS and tRNA$_{CUA}^{Pyl}$ genes and the other was a pETduet plasmid that contained a gene coding the CA$_5$X-sfGFP protein. Growing the transformed cells in the presence of AcrK afforded CA$_5$X-sfGFP. Labeling this protein with HZC1 lead to no blue fluorescent product.

Figure 3C:
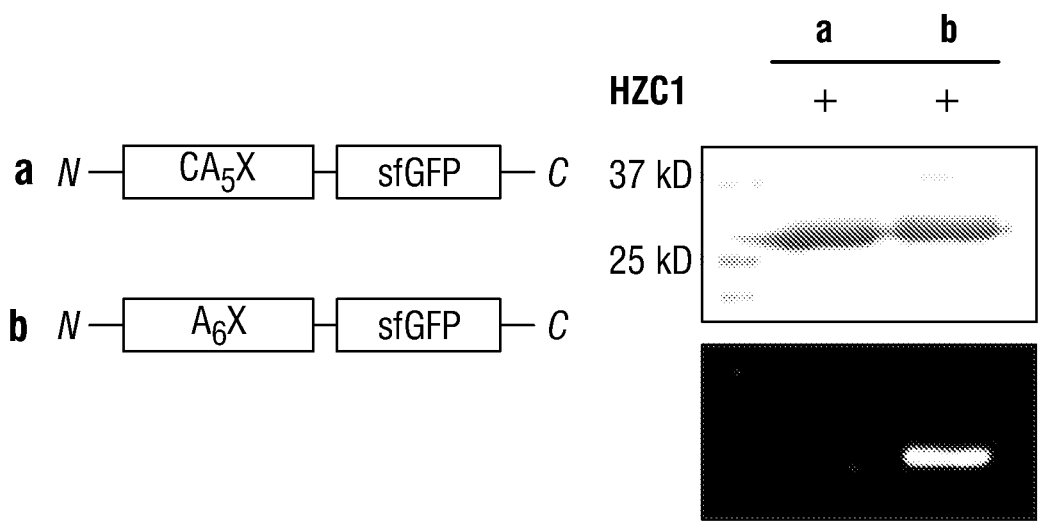
FIG. 3C shows two superfolder green fluorescent protein (sfGFP) derivatives, one with a N-terminal $CA_5X$ peptide and the other with a N-terminal $A_6X$ peptide, and their fluorescent labeling with HZC1. X denotes AcrK. Proteins were denatured first and then analyzed by SDS-PAGE. In-gel fluorescence was recorded at the blue region with the excitation at 365 nm.

However, a control sfGFP protein with a N-terminal A$_6$X peptide, that Applicants expressed similarly as CA$_5$X-sfGFP and reacted with HZC1, provided an intense blue fluorescent protein band in a SDS-PAGE gel (FIG. 3C). In parallel, Applicants generated two phages, one with a CA$_5$X peptide and the other with an A$_6$X peptide at the N-terminus of the coating protein pIII. To construct the CA$_5$X phage, Applicants inserted a CA$_5$X-coding DNA fragment between the PelB leader peptide-coding region and the phage pIII-coding (gIII) gene in the pADLg3 phagemid vector that Applicants purchased from Antibody Design Labs.

Applicants used the afforded phagemid pADLg3-CA$_5$X to transform E. coli Top10 cells that also harbored a plasmid pEVOL-PrKRS-CloDF and a mutant helper phage plasmid M13K07-g3TAA. pEVOL-PrKRS-CloDF was derived from pEVOL-PrKRS by switching the replication origin from p15a to CloDF for its compatible use with a helper phage plasmid that typically has a p15a replication origin. Applicants constructed M13K07-g3TAA by introducing a deleterious ochre mutation at the Q350 coding site in the gIII gene of the M13K07 helper phage. Since M13K07-g3TAA had a non-functional gIII gene, its use together with PADLg3-CA$_5$X drove the synthesis of a phage that contained pIII expressed only from the later plasmid. Growing the transformed cells in the presence of AcrK afforded the CA$_5$X phage.

Figure 3D:
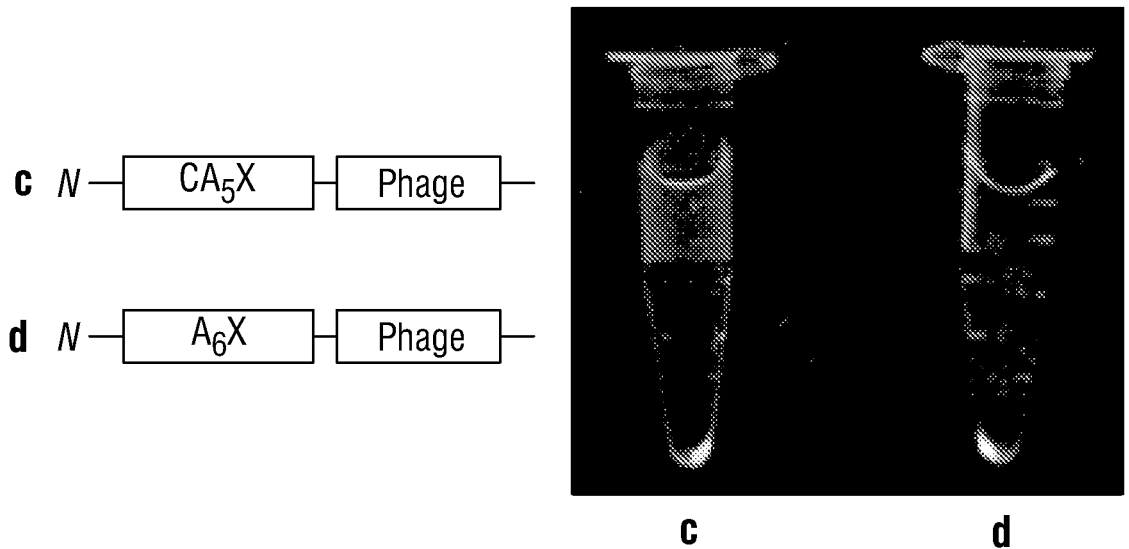
FIG. 3D shows two phage derivatives, one with an N-terminal $CA_5X$ peptide and the other with an N-terminal $A_6X$ peptide, and their fluorescent labeling with HZC1. Phages were precipitated and then fluorescently imaged under UV light.

Applicants used the similar approach to produce the control A$_6$X phage. Following their separation, Applicants carried out labeling of both phages with HZC1. Under UV light, the A$_6$X phage displayed much higher fluorescence than the CA$_5$X phage indicating cyclization between cysteine and AcrK in the CA$_5$X phage (FIG. 3D). The relatively high background of the CA$_5$X phage was due to diffraction from solid precipitated phages.

Figure 4A:
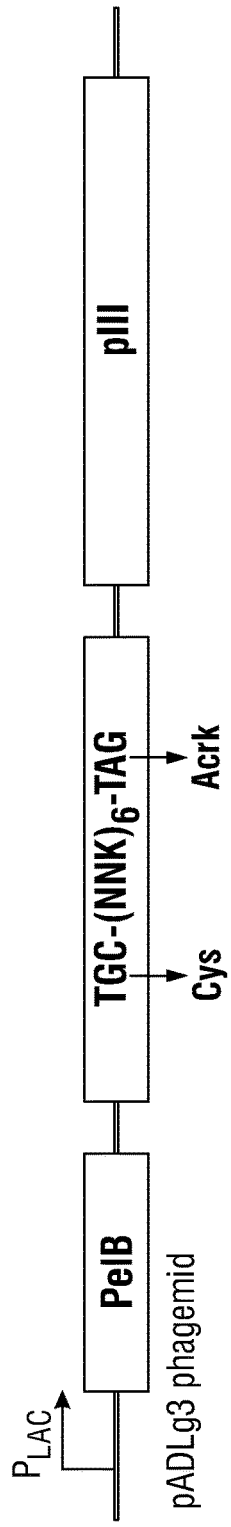
FIG. 4A shows a diagram to show the phagemid structure for the production of a phage-displayed 6-mer cyclic peptide library.
Figure 4C:
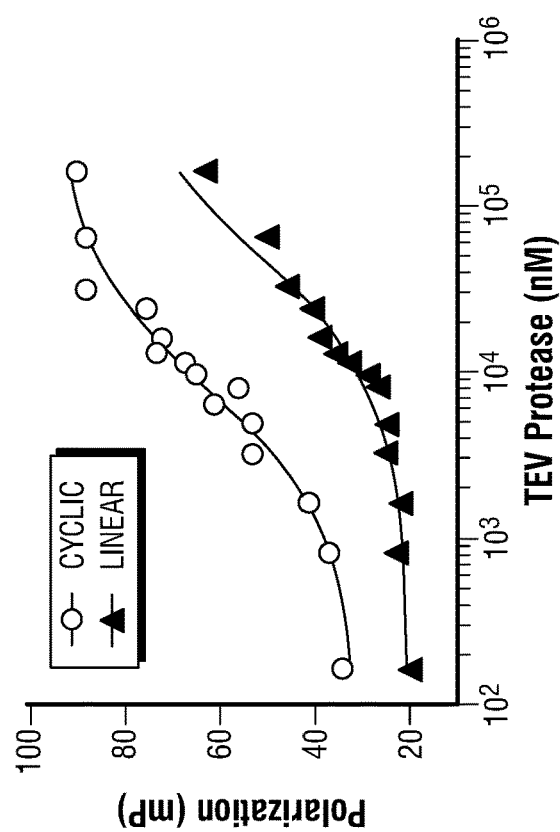
FIG. 4C shows fluorescence polarization analysis of 5FAM-CycTev1 binding to TEV protease. Data for a linear counterpart of 5FAM-CycTev1 with no linker is also included.
Figure 4B:
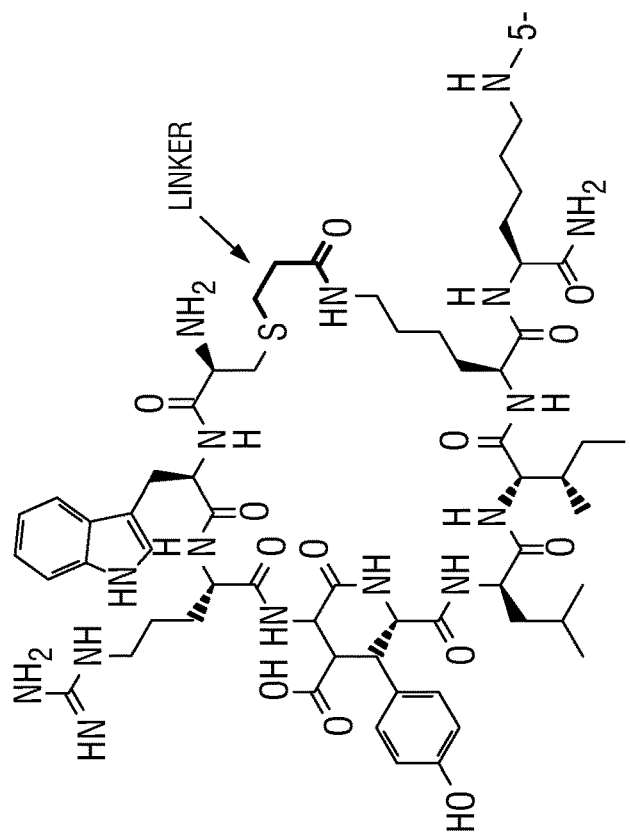
FIG. 4B shows the structure of 5FAM-CycTev1. CycTev1 was selected from phage display.
Figure 4D:
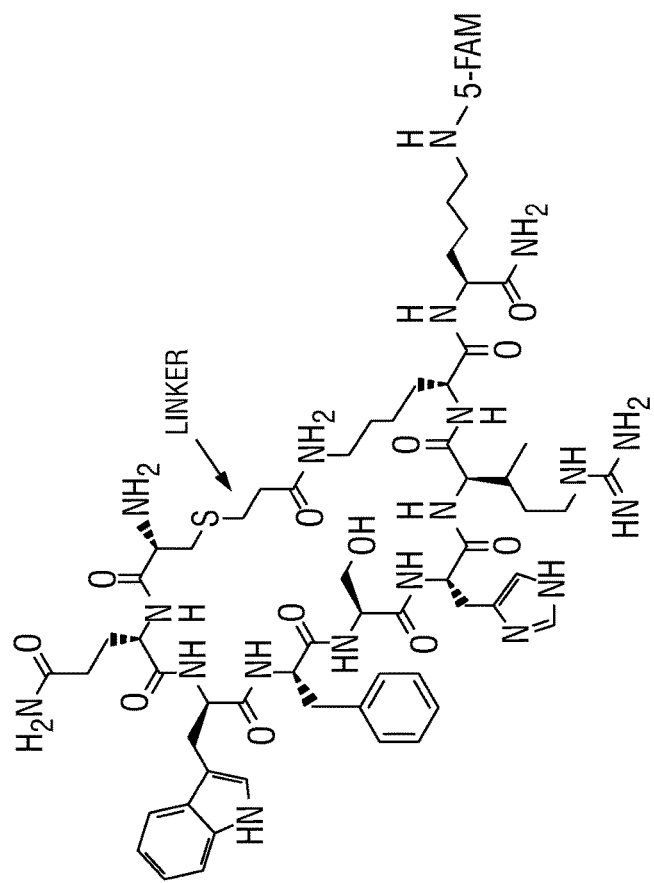
FIG. 4D shows the structure of FITC-CycTev2.
Figure 4E:
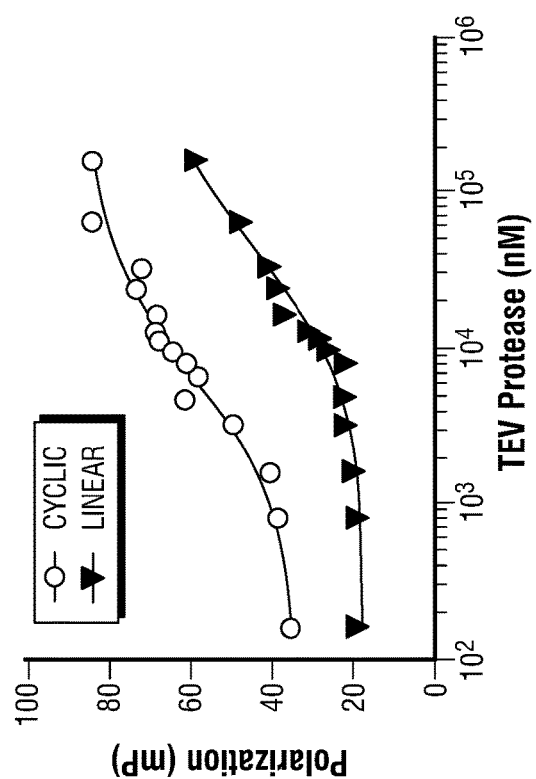
FIG. 4E shows fluorescence polarization analysis of 5FAM-CycTev2 binding to TEV protease. Data for a linear counterpart of 5FAM-CycTev2 with no linker is also included.

These results demonstrated that using AcrK and an adjacent cysteine can efficiently generate cyclic peptides on protein and phage surfaces. Encouraged by the in vitro labeling results, Applicants advanced to construct a phage-displayed 6-mer cyclic peptide library. To afford a phagemid library for the production of phages with displayed cyclic peptides, Applicants inserted a 24 base-pair DNA fragment that encoded six randomized amino acids flanked by a N-terminal cysteine and a C-terminal AcrK between the PelB leader peptide-coding region and the gIII gene of the pADLg3 phagemid (FIG. 4A). 20 clones from this library were sequenced to confirm the library diversity (FIG. 5).

Applicants used this phagemid library to transform E. coli Top10 cells that also contained pEVOL-PrKRS-CloDF and M13K07-g3TAA to afford close to $10^9$ transformants and then grew the transformed cells in the presence of AcrK to produce phages. To demonstrate the viability of using this library to select cyclic peptide ligands for a protein target, Applicants first tested it on a model protein, TEV protease that Applicants conjugated with biotin for its loading onto streptavidin magnetic beads for undergoing selection.

Figure 7:
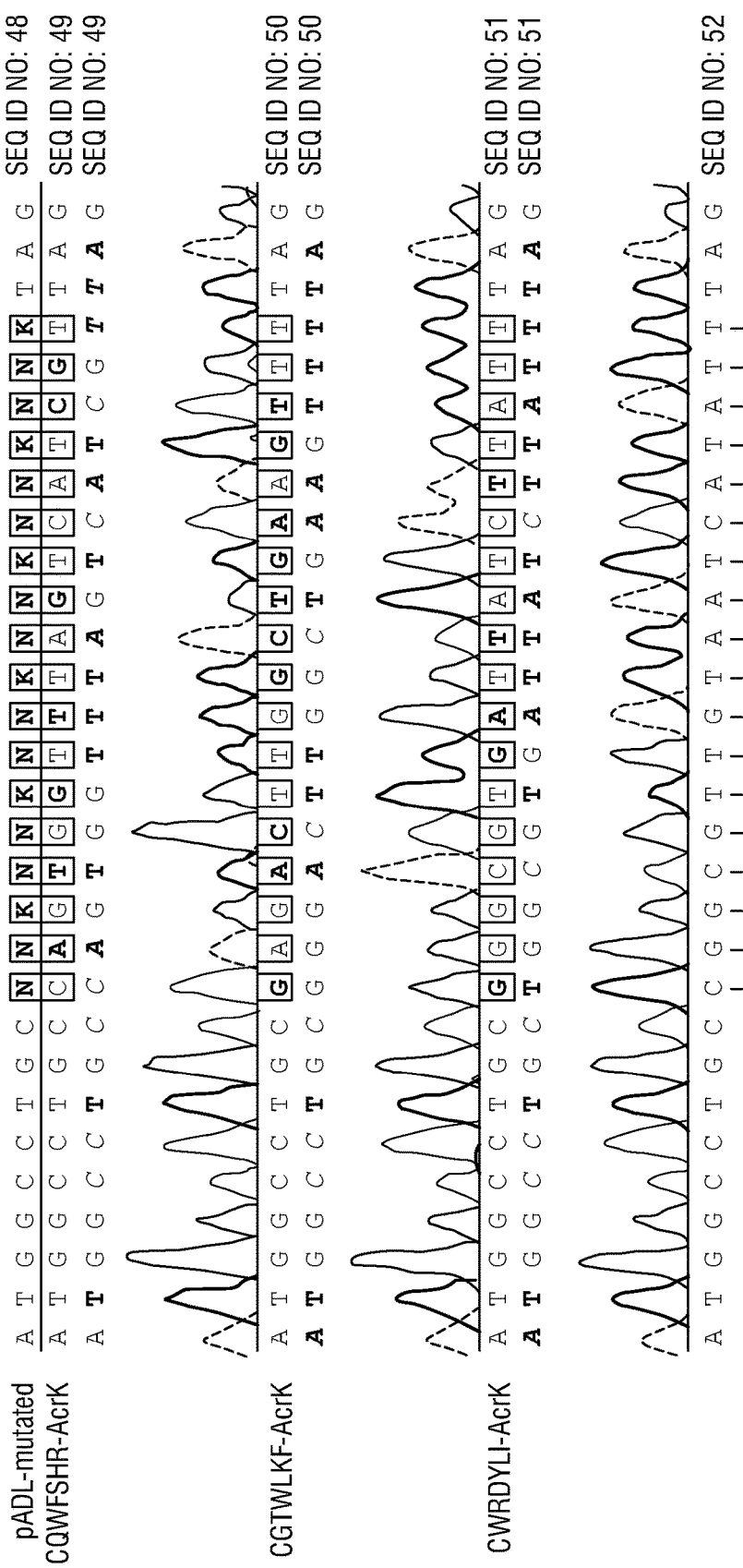
FIG. 7 shows DNA sequencing results and their converged peptide sequences of HDAC8-bound clones.

Applicants carried out three rounds of affinity-based selection. Eluted phages were clearly enriched after each round (FIG. 6). After the third round, Applicants sequenced 25 phage clones that converged to only three peptide sequences, CycTev1, CycTev2, and CycTev3 (FIG. 7). Using solid-phase peptide synthesis, Applicants synthesized 5-FAM-conjugated CycTev1, CycTev2, as well as their linear counterparts and then measured their binding affinities to TEV protease using fluorescence polarization assays. Applicants' results as shown in FIGS. 4B-E and Table 1 indicated that both CycTev1 and CycTev2 bind to TEV protease with a single digit µM dissociation constant and both cyclic peptides bind to TEV protease significantly better than their linear counterpart (>6-fold).

TABLE 1

Determined $K_d$ and $IC_{50}$ values of selected cyclic peptides and their linear counterparts when binding to their protein targets.

| Ligand | Sequence[a] | Protein target | Kd (µM) | IC50 (µM) |
|---|---|---|---|---|
| CycTev1 | CWRDYLIX (SEQ ID NO: 1) | TEV protease | 8.2 ± 0.8 | |
| LinTev1 | CWRDYLIK (SEQ ID NO: 4) | TEV protease | 50 ± 5 | |
| CycTev2 | CQWFSHRX (SEQ ID NO: 2) | TEV protease | 6.9 ± 0.9 | |
| LinTev2 | CQWFSHRK (SEQ ID NO: 5) | TEV protease | 39 ± 5 | 9.7 ± 0.7 |
| CycH8a | CQSLWMNX (SEQ ID NO: 3) | HDAC8 | 7.1 ± 0.7 | |
| LinH8a | CQSLWMNK (SEQ ID NO: 6) | HDAC8 | >50 | |

[a] X denotes AcrK.

These results established the feasibility of using Applicants' genetically encoded phage-displayed cyclic peptide library to identify potent ligands for protein targets and demonstrated that cyclization contributes to the binding.

HDAC8 is a $Zn^{2+}$-dependent histone deacetylase that has been implicated as a therapeutic target in various diseases, including cancer, X-linked intellectual disability, and parasitic infections. Notable efforts have been made to identify potent HDAC8 inhibitors. In order to identify novel cyclic peptide ligands for HDAC8, Applicants carried out selection from their genetically encoded, phage-displayed 6-mer cyclic peptide library similar to that for TEV protease. Out of selected clones that Applicants subsequently sequenced, the majority converged to a single sequence CycH8a (Table 1 and FIG. 8).

Figure 9B:
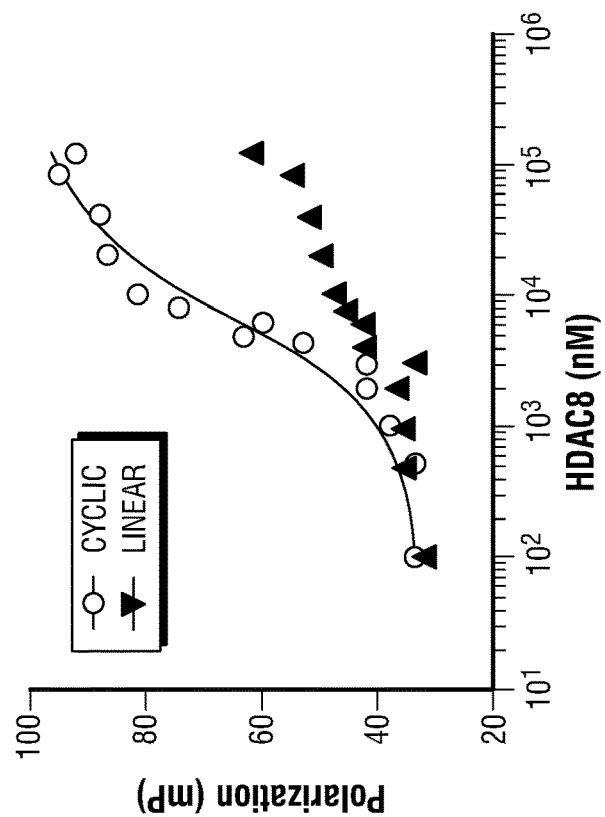
FIG. 9B shows fluorescence polarization analysis of 5FAM-CycH8a binding to HDAC8. Data for a linear counterpart of 5FAM-CycH8a is also included.
Figure 9A:
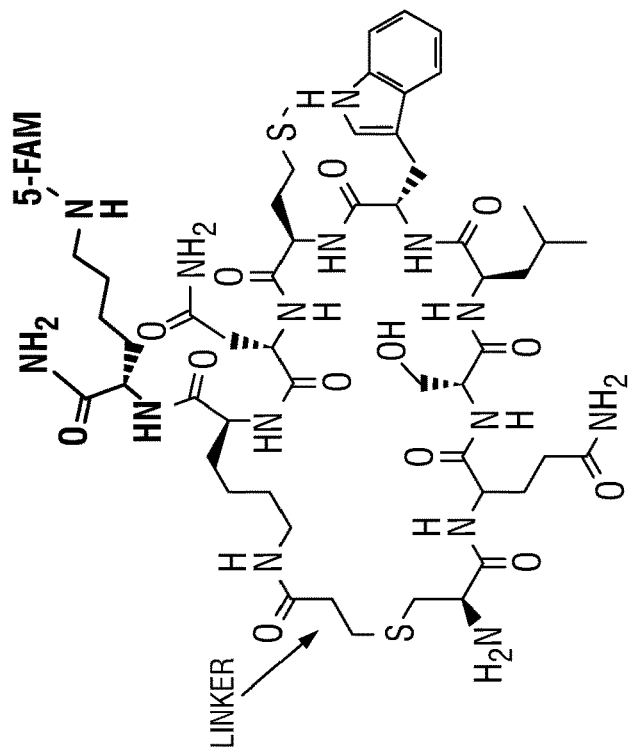
FIG. 9A shows the structure of 5FAM-CycH8a. The sequence of CycH8a was selected from phage display.

To determine the affinity of CycH8a to HDAC8, Applicants synthesized 5-FAM-conjugated CycH8a (FIG. 9A) and then characterized its binding to HDAC8 using the fluorescence polarization analysis. The result indicated a 7.1 µM dissociation constant (FIG. 9B).

Applicants also synthesized 5-FAM-conjugated LinH8a, a linear counterpart of CycH8a and tested its binding to HDAC8. However, LinH8a bound very weakly to HDAC8. Due to the fact that HDAC8 aggregated at a concentration higher than 100 µM, Applicants were not able to collect enough data to accurately determine $K_d$ for LinH8a though it is estimated to be higher than 50 µM. Therefore, the cyclization is desirable to provide high potency to CycH8a for its binding to HDAC8.

For a ligand that is selected from a library through direct binding to a protein target, it does not necessarily bind to the active site of the protein for direct inhibition. To test whether CycH8a can directly inhibit the deacetylation activity of HDAC8, Applicants adopted a HDAC8 activity assay as shown in FIG. 9C and synthesized the substrate Boc-AcK-AMC. In this assay, HDAC8 catalyzed the deacetylation of Boc-AcK-AMC to afford Boc-K-AMC that reacted with the coupling enzyme trypsin to release the fluorescent AMC, a compound that Applicants could easily track in a fluorescent plate reader. As shown in FIG. 9D, providing CycH8a to the assay inhibited the deacetylation of Boc-AcK-AMC by HDAC8. The determined $IC_{50}$ value in the conditions of 5 µM HDAC8 and 50 µM Boc-AcK-AMC is 9.7 µM, close to the determined $K_d$ value. Given that $IC_{50}$ is not a direct binding affinity indicator and influenced by the concertation of the used substrate, its slightly higher value than $K_d$ was expected.

Collectively, results in FIG. 9 demonstrated a successful application of using Applicants' genetically encoded, phage-displayed cyclic peptide library in identifying a potent cyclic peptide inhibitor for a therapeutic protein target.

Figure 10:
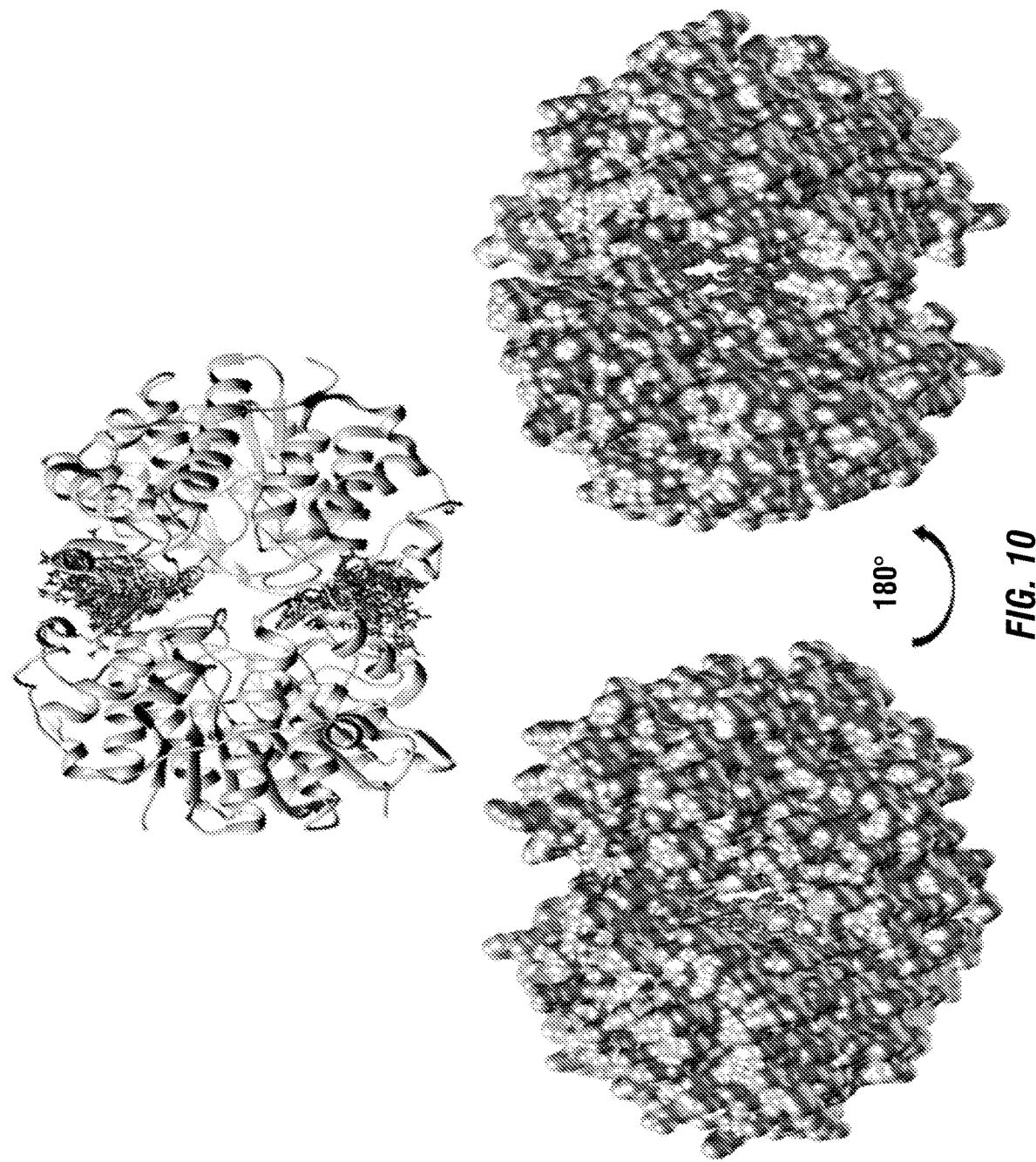
FIG. 10 shows the molecular docking results of CycH8a binding to the HDAC8 dimer. The top panel show different CycH8a conforms binding at two grooves of the HDAC8 dimer interface. The bottom panel presents the most favorable conform of CycH8a binding at each groove.

To gain insight into how CycH8a might interact with HDAC8, Applicants virtually docked CysH8a on HDAC8. HDAC8 naturally occurs in a dimeric form. Therefore, Applicants investigated both monomeric and dimeric HDAC8 as the receptor for docking. The docking results indicated that CycH8a binds weakly to monomeric HDAC8 but fits favorably in two grooves that are at the dimeric interface of HDAC8 and close to the two active sites (FIG. 10). Several published crystal structures of HDAC8-substrate complexes have shown that the two dimer interface grooves are also part of channels for binding peptide substrates.

The binding of CycH8a at the two grooves will block the entry of a peptide substrate to the two active sites, which provides an explanation for the inhibition of HDAC8 by CycH8a. Given that the docking indicated that CycH8a binds close to the active site channel of HDAC8 and many potent small-molecule HDAC8 inhibitors including a number of hydroxamate derivatives bind directly inside the active site channel, one possibility to develop more potent HDAC8 inhibitors is to conjugate an active site-targeting inhibitor and CycH8a to form a tight-binding, bidentate ligand.

In summary, Applicants have developed a novel phage display technique that allows the construction of a genetically encoded, phage-displayed cyclic peptide library. The cyclization of phage displayed peptides are achieved by a proximity-driven Michael addition reaction between a cysteine and an AcrK that flank a randomized 6-mer peptide sequence. AcrK was encoded by an amber codon and its incorporation into phages was mediated by an evolved PylRS-tRNA$_{CUA}^{Pyl}$ pair in *E. coli*. Applying the developed library to selection against both TEV protease and HDAC8 afforded cyclic peptide ligands that bind to their protein targets with single digit µM $K_d$ values and significantly better than their linear counterparts.

As a proof of concept, this Example involved relative small size peptides that randomized only 6 residues. It is expected that a library with much bigger randomized peptides will afford the selection of more potent ligands. Given that many electrophilic ncAAs have been incorporated into proteins using the amber suppression mutagenesis approach, they can all potentially be used to construct genetically encoded, phage-displayed cyclic peptide libraries. Since these ncAAs are structurally diverse, their use will impart different structural constraints to phage displayed cyclic peptides that will provide diverse structural diversity beneficial for selection. As a novel addition to the phage display technique, Applicants anticipate that the developed technique will find broad applications in the identification of potent ligands for many surface receptors and strong inhibitors for enzymes and protein-protein/DNA/RNA binding interactions.

EXAMPLE 1.1

The Synthesis of AcrK

The synthesis of AcrK is illustrated in Scheme 1.

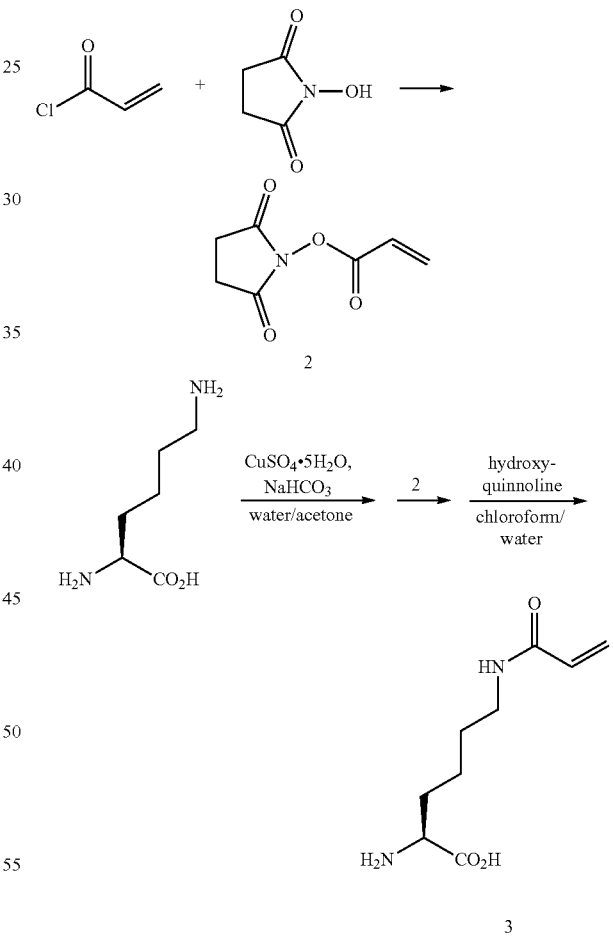

Scheme 1. The synthetic route of AcrK.

To a solution of N-hydroxysuccinimide (1.3 g, 11.3 mmol) in anhydrous dichloromethane (25 mL), Applicants added N,N-diisopropylethylamine (1.5 mL, 8.9 mmol) and then acryloyl chloride (0.8 mL, 9.3 mmol) in ice bath. The mixture was stirred for 10 h at r. t. Applicants extracted the mixture with ethyl acetate, washed it with saturated NH$_4$Cl solution and brine, and dried it with anhydrous MgSO$_4$. Applicants filtered the solution, and evaporated it under vacuum to obtain 2 as yellow oil (1.5 g). Applicants used 2 directly for the next step synthesis without further purification.

To a solution of copper(II) sulfate pentahydrate (1.0 g, 4.0 mmol) in water (50 mL), Applicants added lysine hydrochloride (1.5 g, 8.0 mmol) and sodium bicarbonate (1.9 g, 22.4 mmol). Applicants stirred the mixture at r. t. for 20 min. To this mixture, Applicants added a solution of compound 2 in acetone (20 mL). Applicants stirred the afforded reaction mixture for an additional 8 h. Applicants filtered the blue mixture, washed the blue filter cake with water and acetone, dissolved it in water and chloroform (v/v=1:1, 100 mL), and stirred the afforded solution at r. t. for 5 min.

To the suspension, Applicants then added 8-hydroxyquinoline (1.6 g, 11.0 mmol) and let it stir at r. t. for 30 min. Applicants filtered the green suspension, washed the filtrate with chloroform, concentrated it under reduced pressure, and then subjected it to ion-exchange chromatography for further purification to afford AcrK as a white powder (1.2 g, 60% for two steps).

1H NMR (D$_2$O, 300 MHz) δ 6.2-5.43 (m, 2H), 5.59 (dd, 1H, J=11.4, 1.8 Hz), 3.58 (t, 1H, J=6 Hz,), 3.13 (t, 2H, J=6.9 Hz), 1.71 (m, 2H), 1.46 (m, 2H), 1.24 (m, 2H). 13C NMR (75 MHz, D2O) δ 175.4, 169.1, 130.6, 127.7, 55.3, 39.6, 30.7, 28.6, 22.4.

EXAMPLE 1.2

CA$_5$X-sfGFP and A$_6$X-sfGFP Expression and Their Labeling With HCZ1

The DNA sequence of CA$_5$X-sfGFP is as follows:

(SEQ ID NO: 7)
atg<u>tgtgctgcagcggctgcatag</u>aaaggagaagaactt
ttcactggagttgtcccaattcttgttgaattagatggtgatgttaatgg
gcacaaattttctgtccgtggagagggtgaaggtgatgctacaaacggaa
aactcacccttaaatttatttgcactactggaaaactacctgttccgtgg
ccaacacttgtcactactctgacctatggtgttcaatgcttttcccgtta
tccggatcacatgaaacggcatgacttttttcaagagtgccatgcccgaag
gttatgtacaggaacgcactatatctttcaaagatgacgggacctacaag
acgcgtgctgaagtcaagtttgaaggtgatacccttgttaatcgtatcga
gttaaagggtattgattttaaagaagatggaaacattcttggacacaaac
tcgagtacaactttaactcacacaatgtatacatcacggcagacaaacaa
aagaatggaatcaaagctaacttcaaaattcgccacaacgttgaagatgg
ttccgttcaactagcagaccattatcaacaaaatactccaattggcgatg
gccctgtccttttaccagacaaccattacctgtcgacacaatctgtcctt
tcgaaagatcccaacgaaaagcgtgaccacatggtccttcttgagtttgt
aactgctgctgggattacacatggcatggatgagctctacaaaggatccc
atcaccatcaccatcactaa.
The underlined nucleotides code for CA$_5$X.

The DNA sequence of A$_6$X-sfGFP is as follows:

(SEQ ID NO: 8)
atg<u>gctgctgcagcggctgcatag</u>aaaggagaagaactt
ttcactggagttgtcccaattcttgttgaattagatggtgatgttaatgg
gcacaaattttctgtccgtggagagggtgaaggtgatgctacaaacggaa
aactcacccttaaatttatttgcactactggaaaactacctgttccgtgg
ccaacacttgtcactactctgacctatggtgttcaatgcttttcccgtta
tccggatcacatgaaacggcatgacttttttcaagagtgccatgcccgaag
gttatgtacaggaacgcactatatctttcaaagatgacgggacctacaag
acgcgtgctgaagtcaagtttgaaggtgatacccttgttaatcgtatcga
gttaaagggtattgattttaaagaagatggaaacattcttggacacaaac
tcgagtacaactttaactcacacaatgtatacatcacggcagacaaacaa
aagaatggaatcaaagctaacttcaaaattcgccacaacgttgaagatgg
ttccgttcaactagcagaccattatcaacaaaatactccaattggcgatg
gccctgtccttttaccagacaaccattacctgtcgacacaatctgtcctt
tcgaaagatcccaacgaaaagcgtgaccacatggtccttcttgagtttgt
aactgctgctgggattacacatggcatggatgagctctacaaaggatccc
atcaccatcaccatcactaa.
The underlined nucleotides code for A$_6$X.

EXAMPLE 1.3

The Construction of pETduet-CA$_5$X-sfGFP and pETduet-A$_6$X-sfGFP

Applicants used a previous constructed plasmid pETtrio-PylRS-sfGFP-TAA(Ala)$_5$TAG-PylT as a template. Applicants used PCR to amplify sfGFP with a N-terminal CA$_5$X peptide using two primers: (1) CA$_5$X-F: 5'-GAGATATACC ATGTGT GCTG CAGCGGCTGC-3' (SEQ ID NO: 9); and (2) CA$_5$X-R: 5'-GCAGCCGCTG CAGCACA CAT GGTATATCTC-3' (SEQ ID NO: 10). Next, Applicants digested the PCR product by AflIII and KpnI restriction enzymes. Applicants cloned the digested product into the AflIII and KpnI sites in an empty petDuet-1 vector to afford pETduet-CA$_5$X-sfGFP. Applicants followed the same protocol to construct pETduet-A$_6$X-sfGFP using two primers: (1) CA$_5$X-F: 5'-GAGATATACC ATGGCTGCTG CAGCGGCTGC-3' (SEQ ID NO: 11); and (2) CA$_5$X-R: 5'-GCAGCCGCTG CAGCAGCCAT GGTATATCTC-3' (SEQ ID NO: 12).

EXAMPLE 1.4

Protein Expression and Purification

To express CA$_5$X-sfGFP, Applicants used a previously reported plasmid pEVOL-PrKRS and pETduet-CA$_5$X-sfGFP to transform BL21(DE3) cells and plate the transformed cells on a LB-agar plate that contained ampicillin (100 μg/mL) and chloramphenicol (34 μg/mL). Applicants picked a single colony for inoculation into 5 mL LB medium supplemented with 100 μg/mL ampicillin and 34 μg/mL chloramphenicol. Applicants used this overnight culture to inoculate 100 mL LB medium and let grow at 37° C. in an incubating shaker (250 rpm). When OD$_{600}$ reached to 0.8, Applicants added 1 mM AcrK, 1 mM IPTG, and 0.2% arabinose to induce the protein expression. After 8-hour induction, Applicants harvested cells by centrifugation of cell medium at 4000 g for 15 min and then resuspended cells in a lysis buffer (50 mM $NaH_2PO_4$, 250 mM NaCl, 10 mM imidazole, pH 8.0) that Applicants sonicated in an ice bath six times (2 min each pulse, 5 min interval for cooling). Applicants clarified the cell lysate by centrifugation at 1000 g for 60 min (4° C.), collected the supernatant, and incubated it with 1 mL Ni-NTA resin (Qiagen) (1.5 h, 4° C.). Applicants washed the protein-resin mixture with 50 mL of the wash buffer containing 50 mM $NaH_2PO_4$, 250 mM NaCl and 10 mM imidazole (pH 8.0), and eluted $CA_5X$-sfGFP by the elution buffer containing 50 mM $NaH_2PO_4$, 250 mM NaCl and 250 mM imidazole (pH 8.0). Applicants concentrated the purified protein and dialyzed it against a buffer containing 10 mM ammonium bicarbonate.

Figure 11:
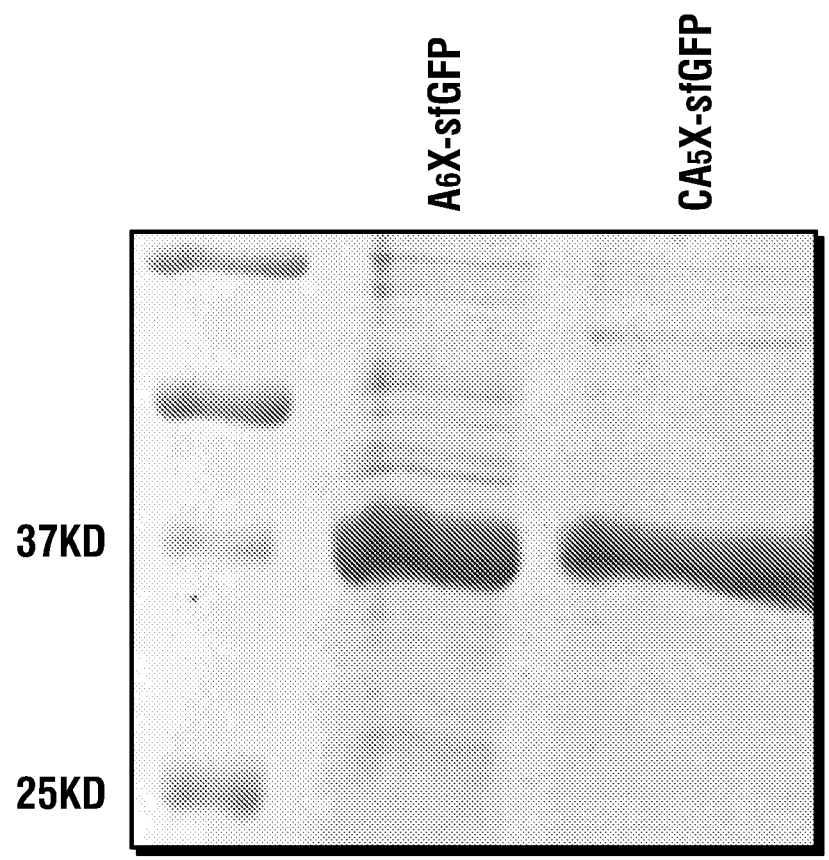
FIG. 11 shows the expression of $A_6X$-sfGFP and $CA_5X$-sfGFP.

Applicants analyzed the finally purified protein by 15% SDS-PAGE and stored it at −80° C. (FIG. 11). The expression and purification of $A_6X$-sfGFP followed the exactly same protocol except Applicants replaced the plasmid pET-duet-$CA_5X$-sfGFP with the plasmid pETduet-$A_6X$-sfGFP.

EXAMPLE 1.5

Labeling $CA_5X$-sfGFP and $A_6X$-sfGFP with HCZ1

Applicants synthesized HCZ1 according to a previous publication. For labeling $CA_5X$-sfGFP and $A_6X$-sfGFP, Applicants added HZC1 (5 mM, 15 μL) to two different solutions of $CA_5X$-sfGFP and $A_6X$-sfGFP (5 μM, 500 μL) in a 1:1 acetonitrile-50 mM phosphate buffer (pH10 without chloride), incubated the mixtures for 10 min, and then quenched reactions by adding 500 mM acrylamide. Applicants purified proteins after labeling using Ni-NTA resin (5 μL), spun down the protein-bound resin (10 min, 13.4K), and washed it with water for 4 times. After boiling the resin in a 6× protein loading buffer (375 mM Tris-HCl, 10% SDS, 30% Glycerol, 0.03% Bromophenol blue, 600 mM DTT) and filtration to remove precipitates, Applicants eluted bound proteins and subjected them to 15% SDS-PAGE analysis. Applicants performed in-gel fluorescence detection using a BioRad ChemiDoc XRS+ Imaging system before Applicants stained the gel with Coomassie blue.

EXAMPLE 1.6

The Expression of pADLg3-$CA_5X$ and pADLg3-$A_6X$ Phages and Their Labeling With HCZ1

Applicants derived the M13K07-g3TAA helper phage plasmid from M13K07 by doing Quik-Change mutagenesis. Applicants used two primers: (1) M13K07g3TAA-F: 5'-gttgaaagtt gtttagcaTa accccataca gaaaattc-3' (SEQ ID NO: 13); and (2) M13K07TAA-R: 5'-gaattttctg tatggggttA tgctaaacaa ctttcaac-3' (SEQ ID NO: 14). Applicants followed a Pfu-catalyzed standard Quik-Change protocol to introduce a single TAA mutation at the K10 coding site of the gIII gene.

Figure 12:
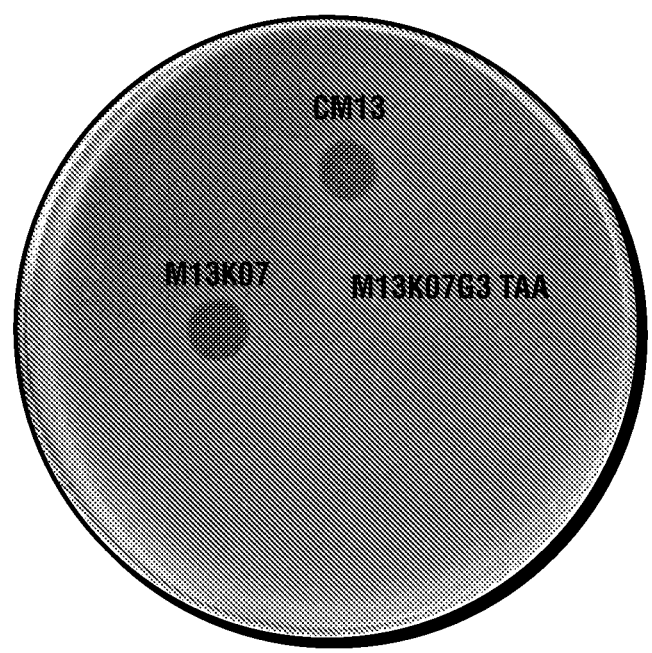
FIG. 12 shows confirmation of pIII knockout in M13KO7-g3TAA. Supernatants from *E. coli* cultures expressing M13KO7-g3TAA or wildtype M13KO7 and CM13 were spotted onto an overlay of top agar containing *E. coli* Top10 F'. The presence of plaques in the wildtype M13KO7 and CM13 spots indicates the presence of viable phages. The lack of plaques in the M13KO7-g3TAA spot confirms the loss of pIII which is required for host infection.

Applicants performed two experiments to validate M13K07-g3TAA as a helper phage for polyvalent display. To confirm the phenotypic knockout of pIII, Applicants expressed the helper phage in E. coli Top10 F' at 37° C. overnight in 2×YT containing 25 μg·mL$^{-1}$ kanamycin. The following day, the cells were pelleted and the supernatant was incubated at 65° C. for 15 minutes to kill residual bacteria. The heat-killed supernatant (10 μL) was then spotted onto an overlay of E. coli Top10 F' in top agar on agar containing 10 μg·mL$^{-1}$ tetracycline and incubated at 37° C. overnight. As positive controls, Applicants also expressed and spotted wildtype M13KO7 and CM13 phages (Antibody Design Labs). After overnight incubation, a zone of delayed cell growth was present for the spots corresponding to wildtype M13KO7 and CM13 indicating the presence of viable phages. By contrast, no delayed growth was observed in the spot corresponding to M13KO7-g3TAA confirming the loss of functional pIII which is required for host infection (FIG. 12).

Figure 13:
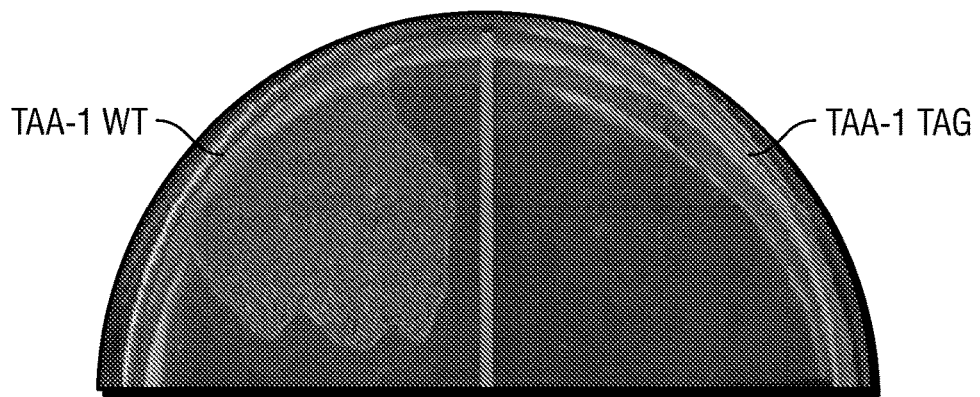
FIG. 13 shows an M13KO7-g3TAA phagemid complementation assay. *E. coli* Top10 F' were infected with supernatants from cultures expressing wildtype pIII (left) or pIII with an in-frame amber mutation (right). The growth of cells infected with the wildtype pIII supernatant confirms the ability of M13KO7-g3TAA to complement phagemids bearing viable pIII.

Next, Applicants confirmed the ability of M13KO7-g3TAA to complement a phagemid bearing pIII and produce viable phages. To do this, Applicants co-transformed E. coli Top10 F' with M13KO7(pIII$^-$) and one of two phagemids: pADL-10b (antibody Design Lab Inc.) or pADL-g3TAG. pADL-10b contains the gene encoding wildtype pIII whereas pADL-g3TAG contains wildtype pIII with an in-frame amber mutation at the G1 coding site right after the pelB coding sequence. The transform cells were grown in 2×YT media containing 100 μg·mL$^{-1}$ ampicillin and 25 μg·mL$^{-1}$ kanamycin to an $OD_{600}$ of 0.8 at which point pIII expression was induced with the addition of IPTG. Following overnight incubation, the supernatants were collected and heat-killed as described above and 10 μL of the heat-killed supernatants were used to infect 90 μL of log-phase E. coli Top10 F' for 45 minutes. Infected cultures were spread onto agar selection plates containing 100 μg·mL$^{-1}$ ampicillin and grown at 37° C. overnight. No growth was observed for cells that were infected with the supernatant from pADL-g3TAG as both the phagemid and helper phage contain nonsense mutations in pIII. However, plating cells infected with the supernatant from pADL-10b resulted in a dense patch of cell growth confirming the ability of M13KO7-g3TAA to complement phagemid-borne pIII and produce functional phagemid particles (FIG. 13).

To introduce the Cys-$Ala_5$-AcrK sequence to phages, a previously constructed plasmid pADL-NcoI-g3-AAKAA (modified from pADL-10b) was PCR amplified with the 5'-end primer, pADL-NcoI-Cys-$Ala_5$-TAG-g3-F: 5'-GCTTCCATGG CCTGCGCAGC AGCAGCAGCA TAGGCGGCGA AAGCGG-3' (SEQ ID NO: 15), and the 3'-end primer, pADL-NcoI-Cys-$Ala_5$-TAG-R: 5'-GCTTC-CATGG CCGGCTGGGC CGC-3' (SEQ ID NO: 16) using Phusion high-fidelity DNA polymerase. The PCR product was digested with DpnI and NcoI, followed by ligation with T4 DNA ligase, and then used to transform E. coli Top10. The pADLg3-$A_6X$ was constructed similarly as described above with 5'-end primer, pADL-NcoI-$Ala_6$-TAG-g3-F: 5'-GCTTCCATGG CCGCAGCAGC AGCAGCAGCA TAGGCGGCGA AAGCGG-3' (SEQ ID NO: 17) and the 3'-end primer, pADL-NcoI-$Ala_6$-TAG-R: 5'-GCTTC-CATGG CCGGCTGGGC CGC-3' (SEQ ID NO: 18).

Applicants derived the plasmid pEVOL-PrKRS-CloDF from pEVOL-PrKRS. The original from pEVOL-PrKRS has the p15a replication origin that is not compatible with the use of pADLg3 in a same cell host. To swap the p15a replication origin with the CloDF replication origin, Applicants used two primers ColDF-F: 5'-ttggcgcgcc caaatagcta gctcactcgg tc-3' (SEQ ID NO: 19), and ColDF-R: 5'-tgttcctagg gataaattgc actgaaatct ag-3' (SEQ ID NO: 20) to amplify the CloDF gene from the pCDFDuet™-1 plasmid from Novagen and two other primers pEVOL-F: 5'-tgttcctagg tcttcaaatg tagcacctga ag-3' (SEQ ID NO: 21), and pEVOL-R: 5'-ttggcgcgcc ccttttttct cctgccacat g-3' (SEQ ID NO: 22) to amplify the backbone structure of pEVOL-PrKRS without the p15a region.

Applicants digested both PCR products by restriction enzymes AscI and AvrII, purified the digested products, and then ligated them together using T4 DNA ligase. Applicants transformed *E. coli* Top10 cells with the ligated product and then confirmed the afforded plasmid by sequencing the whole plasmid.

The pADLg3-CA$_5$X and pADLg3-A$_6$X were electroporated into *E. coli* Top10 competent cells, containing M13KO7-g3TAA and pEVOL-PrKRS-ColDF. Then the cells were inoculated into 100 mL 2YT medium, containing ampicillin, chloramphenicol and kanamycin and induced the pIII expression by adding 0.2% arabinose, 1 mM IPTG, and 5 mM AcrK when OD$_{600}$ reached 0.5. After 12 h induction, the culture was collected, clarified by centrifugation, and the supernatant was collected. Then a chilled polyethylene glycol solution was added to the supernatant to precipitate phages. The mixture was then centrifuged (30 min, 10,000 g, 4° C.), and the phage pellets were resuspended in PBS buffer and centrifuged again. The supernatant was then collected and heated to 65° C. for 15 min to kill all the remaining cells.

To label pADLg3-CA$_5$X and pADLg3-A$_6$X phages with HCZ1, 90 uL of CA$_5$X and A$_6$X phage solutions were added to 90 uL of acetonitrile with or without the presence of 20 uM HZC1. The mixtures were incubated for 2 hours and then added a polyethylene glycol solution and centrifuged (30 min, 10,000 g, 4° C.) to afford phage pellets. The pellets were recorded by the ChemiDOC imaging system using the default EtBr protocol.

EXAMPLE 1.7

The Expression of TEV Protease

Figure 14:
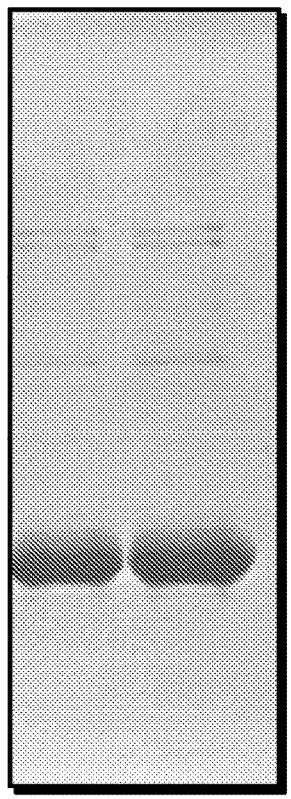
FIG. 14 shows the expression of TEV protease.

Applicants transformed BL21(DE3) cells with a pTEV plasmid containing a gene coding a N-terminal His-tagged TEV protease. Applicants picked up a single colony and cultured it in 5 mL LB medium at 37° C. Applicants used this overnight culture to inoculate 500 mL 2×YT medium supplemented with ampicillin (100 µg/mL) and grew cells at 37° C. in an incubating shaker (250 rpm). When OD$_{600}$ reached 0.4~0.6, Applicants added 0.8 mM IPTG to induce the TEV protease expression. After 4 h induction, Applicants harvested cells by centrifugation at 4000 g for 15 min, and resuspended the pelleted cells in a lysis buffer (50 mM NaH$_2$PO$_4$, 250 mM NaCl, 10 mM imidazole, pH 8.0). Applicants sonicated the resuspended cells in an ice bath six times (2 min each pulse, 5 min interval for cooling), and clarified the cell lysate by centrifugation at 1000 g for 60 min (4° C.). Applicants collected the supernatant and incubated it with 1 mL Ni-NTA resin (1.5 h, 4° C.). Applicants washed the protein-resin mixture with 50 mL of the wash buffer containing 50 mM NaH$_2$PO$_4$, 250 mM NaCl and 10 mM imidazole (pH 8.0), and eluted by the elution buffer containing 50 mM NaH$_2$PO$_4$, 250 mM NaCl and 250 mM imidazole (pH 8.0). Applicants concentrated the eluted protein and dialyzed it against a buffer containing 10 mM ammonium bicarbonate. Applicants analyzed the protein by 15% SDS-PAGE (FIG. 14) and stored at −80° C.

EXAMPLE 1.8

The Expression of HDAC8

Figure 15:
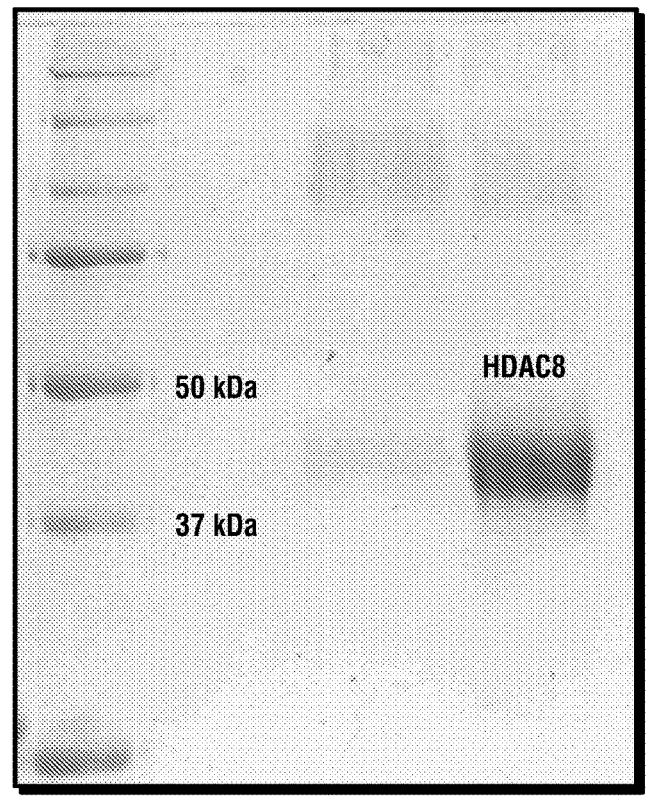
FIG. 15 shows SDS-PAGE analysis of purified HAC8.

Applicants transformed BL21(DE3) CodonPlus cells with pHD4-HDAC8-TEV-His6 and picked up a single colony to grow in 5 mL 2×YT medium supplemented with ampicillin (Amp) (100 µg/mL) overnight. Applicants inoculated this overnight culture to 500 mL auto-induction TB medium (24 g/L yeast extract, 12 g/L tryptone, 8 g/L tris, 4 g/L lactose, 1 g/L glycerol, pH 7.5) supplemented with 100 µg/mL ampicillin and 200 µM ZnSO$_4$. Applicants grew cells at 37° C. in an incubating shaker (250 rpm). After 20 h auto-induction, Applicants harvested cells by centrifugation at 4000 g for 15 min, and resuspended the collected cells in a lysis buffer (50 mM NaH$_2$PO$_4$, 250 mM NaCl, 10 mM imidazole, pH 8.0). Applicants sonicated the resuspended cells in an ice bath six times (3 min each pulse, 6 min interval for cooling), and clarified the cell lysate by centrifugation at 1000 g for 60 min (4° C.). Applicants collected the supernatant by decanting and incubating it with 1 mL Ni-NTA resin (1.5 h, 4° C.). Applicants washed the protein-resin mixture with 50 mL of the washing buffer containing 50 mM NaH$_2$PO$_4$, 250 mM NaCl and 10 mM imidazole (pH 8.0), and eluted the protein by the elution buffer containing 50 mM NaH$_2$PO$_4$, 250 mM NaCl and 250 mM imidazole (pH 8.0). Applicants combined the eluted fractions, concentrated it, and then subjected it to a Q Sepharose FPLC chromatography (GE Healthcare) for further purification. Applicants dialyzed the finally purified protein against a dialysis buffer (25 mM Tris-HCl, 300 mM NaCl, 200 µM ZnSO$_4$, 5 µM KCl, pH7.5), analyzed it by 15% SDS-PAGE (FIG. 15), and stored the protein as 5 µM aliquots at −80° C.

EXAMPLE 1.9

The Construction of a Phagemid Library With a Randomized 6 Coding Sites and Their Expression as a Phage Library The DNA sequence of the pADLg3-TGC-(NNK)$_6$-TAG phagemid library is as follows:

(SEQ ID NO: 23)
```
gcacttttcggggaaatgtgcgcggaaccctatttgtttattttctaa atacattcaaatatgtatccgctcatgagacaataaccctgataaatgct tcaataatattgaaaaaggaagagtatgagtattcaacatttccgtgtcg cccttattcccttttttgcggcattttgccttcctgttttttgctcaccca gaaacgctggtgaaagtaaaagatgctgaagatcagttgggtgcacgagt gggttacatcgaactggatctcaacagcggtaagatccttgagagttttc gccccgaagaacgttttccaatgatgagcacttttaaagttctgctatgt ggcgcggtattatcccgtattgacgccgggcaagagcaactcggtcgccg catacactattctcagaatgacttggttgagtactcaccagtcacagaaa agcatcttacggatggcatgacagtaagagaattatgcagtgctgccata accatgagtgataacactgcggccaacttacttctgacaacgatcggagg accgaaggagctaaccgcttttttgcacaacatggggatcatgtaactc gccttgatcgttgggaaccggagctgaatgaagccataccaaacgacgag cgtgacaccacgatgcctgtagcaatggcaacaacgttgcgcaaactatt aactggcgaactacttactctagcttcccggcaacaattaatagactgga tggaggcggataaagttgcaggaccacttctgcgctcggcgcttccggct ggctggtttattgctgataaatctggagccggtgagcgtgggtctcgcgg tatcattgcagcactggggccagatggtaagccctcccgtatcgtagtta tctacacgacggggagtcaggcaactatggatgaacgaaatagacagatc gctgagataggtgcctcactgattaagcattggtaactgtcagaccaagt ttactcatatatactttagattgatttaaaacttcattttaattaaaa ggatctaggtgaagatccttttgataatctcatgaccaaaatcccttaa
```

-continued cgtgagttttcgttccactgagcgtcagacccgtagaaaagatcaaagg
atcttcttgagatcctttttttctgcgcgtaatctgctgcttgcaaacaa
aaaaaccaccgctaccagcggtggtttgtttgccggatcaagagctacca
actctttttccgaaggtaactggcttcagcagagcgcagataccaaatac
tgttcttctagtgtagccgtagttaggccaccacttcaagaactctgtag
caccgcctacatacctcgctctgctaatcctgttaccagtggctgctgcc
agtggcgataagtcgtgtcttaccgggttggactcaagacgatagttacc
ggataaggcgcagcggtcgggctgaacggggggtcgtgcacacagccca
gcttggagcgaacgacctacaccgaactgagatacctacagcgtgagcta
tgagaaagcgccacgcttcccgaagggagaaaggcggacaggtatccggt
aagcggcagggtcggaacaggagagcgcacgagggagcttccaggggaa
acgcctggtatctttatagtcctgtcgggtttcgccacctctgacttgag
cgtcgatttttgtgatgctcgtcaggggggcggagcctatggaaaaacgc
cagcaacgcggcctttttacggttcctggccttttgctggccttttgctc
acatgacccgacaccatcgaatggcgcaaaacctttcgcggtatggcatg
atagcgcccggaagagagtcaattcagggtggtgaatgtgaaaccagtaa
cgttatacgatgtcgcagagtatgccggtgtctcttatcagaccgtttcc
cgcgtggtgaaccaggccagccacgtttctgcgaaaacgcgggaaaagt
ggaagcggcgatggcggagctgaattacattcccaaccgcgtggcacaac
aactggcgggcaaacagtcgttgctgattggcgttgccacctccagtctg
gccctgcacgcgccgtcgcaaattgtcgcggcgattaaatctcgcgcga
tcaactgggtgccagcgtggtgtgtcgatggtagaacgaagcggcgtcg
aagcctgtaaagcggcggtgcacaatcttctcgcgcaacgcgtcagtggg
ctgatcattaactatccgctggatgaccaggatgccattgctgtggaagc
tgcctgcactaatgttccggcgttattcttgatgtctctgaccagacac
ccatcaacagtattatttctcccatgaagacggtacgcgactgggcgtg
gagcatctggtcgcattgggtcaccagcaaatcgcgctgttagcgggcc
attaagttctgtctcggcgcgtctgcgtctggctggctggcataaatc
tcactcgcaatcaaattcagccgatagcggaacgggaaggcgactggagt
gccatgtccggttttcaacaaaccatgcaaatgctgaatgagggcatcgt
tcccactgcgatgctggttgccaacgatcagatggcgctgggcgcaatgc
gcgccattaccgagtccgggctgcgcgttggtgcggacatctcggtagtg
ggatacgacgataccgaagacagctcatgttatatcccgccgttaaccac
catcaaacaggattttcgcctgctggggcaaaccagcgtggaccgcttgc
tgcaactctctcagggccaggcggtgaagggcaatcagctgttgcccgtc
tcactggtgaaaagaaaaccaccctggcgcccaatacgcaaaccgcctc
tccccgcgcgttggccgattcattaatgcagctggcacgacaggtttccc
gactggaaagcgggcagtgagcggtacccgataaaagcggcttcctgaca
ggaggccgttttgttttgcagcccacctcaacgcaattaatgtgagttag
ctcactcattaggcaccccaggctttacactttatgcttccggctcgtat
gttgtgtggaattgtgagcggataacaatttcacacaggaaacagctatg -continued accatgattacgaatttctagataacgagggcaaatcatgaaataccat
tgcctacgcggccgctggattgttattactcgcggcccagccggccatg
gcctgcnnknnknnknnkmknnktag
ggcccgggaggccaaggcggtggttctgagggtggtggctccctcgaggg
cgcgccagccgaaactgttgaaagttgtttagcaaaacctcatacagaaa
attcatttactaacgtctggaaagacgacaaaactttagatcgttacgct
aactatgagggctgtctgtggaatgctacaggcgttgtggtttgtactgg
tgacgaaactcagtgttacggtacatgggttcctattgggcttgctatcc
ctgaaaatgagggtggtggctctgagggtggcggttctgagggtggcggt
tctgagggtggcggtactaaacctcctgagtacggtgatacacctattcc
gggctatacttatatcaaccctctcgacggcacttatccgcctggtactg
agcaaaaccccgctaatcctaatccttctcttgaggagtctcagcctctt
aatactttcatgtttcagaataataggttccgaaataggcagggtgcatt
aactgtttatacgggcactgttactcaaggcactgaccccgttaaaactt
attaccagtacactcctgtatcatcaaaagccatgtatgacgcttactgg
aacggtaaattcagagactgcgctttccattctggctttaatgaggatcc
attcgtttgtgaatatcaaggccaatcgtctgacctgcctcaacctcctg
tcaatgctggcggcggctctggtggtggttctggtggcggctctgagggt
ggcggctctgagggtggcggttctgagggtggcggctctgagggtggcgg
ttccgtggcggctccggttccggtgatttgattatgaaaaaatggcaa
acgctaataagggggctatgaccgaaaatgccgatgaaaacgcgctacag
tctgacgctaaaggcaaacttgattctgtcgctactgattacggtgctgc
tatcgatggtttcattggtgacgtttccggccttgctaatggtaatggtg
ctactggtgattttgctggctctaattcccaaatggctcaagtcggtgac
ggtgataattcacctttaatgaataatttccgtcaatatttaccttcttt
gcctcagtcggttgaatgtcgcccttatgtctttggcgctggtaaaccat
atgaattttctattgattgtgacaaaataaacttattccgtggtgtcttt
gcgtttcttttatatgttgccacctttatgtatgtattttcgacgtttgc
taacatactgcgtaataaggagtcttaatcaagctttaatattttgttaa
aattcgcgttaaattttgttaaatcagctcattttttaaccaataggcc
gaaatcggcaaaatcccttataaatcaaaagaatagaccgagatagggtt
gagtgttgttccagtttggaacaagagtccactattaaagaacgtggact
ccaacgtcaaaggcgaaaaccgtctatcagggcgatggcccactacgt
gaaccatcaccctaatcaagttttttggggtcgaggtgccgtaaagcact
aaatcggaaccctaaagggagcccccgatttagagcttgacggggaaagc
cggcgaacgtggcgagaaaggaagggaagaaagcgaaaggagcgggcgct
agggcgctggcaagtgtagcggtcacgctgcgcgtaaccaccacacccgc
cgcgcttaatgcgccgctacagggcgcgtcaggtg.

The mutated sites are underlined in bold. n presents any of a, g, c, t, and k presents g or t.

Applicants constructed the phagemid library by undergoing PCR to directly amplify the pADL-10b plasmid using two primers pADL-F: 5'-GGTCCGTCCA TGGCCTGCNN KNNKNNKNNK NNKNNKTAGG GCCCGGG-3' (SEQ ID NO: 24), and pADL-R: 5'-CCACGGCCAT GGCCGGCTG GGCCGCG-3' (SEQ ID NO: 25). Applicants digested the PCR product using the NcoI restriction enzyme and ligated the digested product using T4 DNA ligase. DpnI was also used to remove the template phagemid. Applicants then electroporated the ligated plasmids into competent E. coli Top10 cells, incubated the transformants in 1 mL LB medium, and then inoculated it into 50 mL LB medium containing 100 µg/mL ampicillin. After $OD_{600}$ reached 1.0, Applicants collected 0.5 mL of the cell culture, mixed it with 50% glycerol, and stored in −80° C. Several aliquots are made for the total coverage of more than $10^{11}$ cfu. To collect the phagemids, Applicants normalized amount of cell stocks to guarantee equal amount of phagemids from each aliquot. Applicants isolated 20 clones from this library and subjected them to DNA sequencing. The sequencing data are presented in FIG. 5. Among these 20 clones, 16 contained the designed sequences, 2 were the original pADL-10b phagemid, and 2 were deleterious cloning products resulted possibly from the synthetic errors in the DNA primers. Among all 16 designed clones, all sites are randomized with no enrichment toward certain codons.

EXAMPLE 1.10

Phage Expression

Applicants electroporated the phagemid library constructed from previous steps into E. coli Top10 competent cells that contained M13KO7-g3TAA and pEVOL-PrKRS-ColDF. Applicants inoculated the transformed cells into 100 mL 2YT medium and induced the pIII expression in the phagemid by adding 0.2% arabinose, 0.5 mM IPTG, and 2 mM AcrK when $OD_{600}$ reached 0.5. After 12 h induction, Applicants spun down cells by centrifugation and collected the supernatants. Applicants then precipitated the supernatants that contained phages by adding chilled polyethylene glycol, and then subjected the solution to centrifugation (15 min, 10,000 g, 4° C.). Applicants collected phage pellets and dissolved them in PBS buffer.

Applicants calculated the total number of phage through the following steps: Applicants incubated 10 uL phage solution in a 65° C. water bath for 15 min to kill all E. coli Top10 cells inside and used the afforded phage solution to infect 90 uL Top10F' ($OD_{600}$=1.0) cells, carried out serial dilution of infected cells, and plated the diluted cells to the agar plate containing 100 µg/mL ampicillin for selecting infected cells. The total yield was around $10^{10}$ cfu per 100 mL LB medium, sufficient to cover library diversity (theoretical diversity of a 6-mer library is $20^6=6.4\times10^6$).

EXAMPLE 1.11

Phage Selection Against TEV Protease and HDAC8

Applicants used streptavidin magnetic beads for their selection. To generate biotinylated proteins in an aqueous solution, Applicants used a biotin sulfosuccinimidyl ester kit (thermos fisher scientific) to conjugate both TEV protease and HDAC8. Applicants incubated a 15 µM purified target protein with 30 µM biotin sulfosuccinimidyl ester in a 50 mM phosphate buffer for 2 h at r. t. Applicants quenched the reaction with the addition of 10 mM lysine and subjected the solution to the protein purification kit from BioRAD Inc. Applicants incubated the purified biotinylated protein with streptavidin magnetic beads (Pierce) for 1 h in the PBS buffer and washed away the unreacted protein.

In the selection, in order to remove individuals capable of non-specific binding, Applicants incubated the phage library with only streptavidin magnetic beads for every round of selection, collected the unbound phages, and then subjected them to bind protein-binding streptavidin magnetic beads for 10 min. Applicants washed the beads 10 times with the PBS buffer containing Tween-20 (8 mM $Na_2HPO_4$, 150 mM NaCl, 3 mM KCl, 2 mM $KH_2PO_4$, 0.05% Tween-20, pH 7.4), eluted the bound phages with a glycine-HCl buffer (pH 2.2), and then neutralized the elutes with a Tris buffer (pH 9.1). Applicants used the eluted phages to infect Top10F' cells to calculated the number of phage particles. To amplify the selected phage library, Applicants infected Top10F' cells with the elutes and propagated the infected cells to amply their hosted phagemids.

Applicants repeated cell transformation, phage expression, and phage selection for consecutive three rounds. For better comparison, Applicants also included controls of background binding phages with streptavidin magnetic beads in each round of selection. Applicants also characterized eluted phage clone numbers. As shown in FIG. 6, eluted phages dramatically increased in their numbers after each round indicating the enrichment of preferred tight bound clones.

Figure 8:
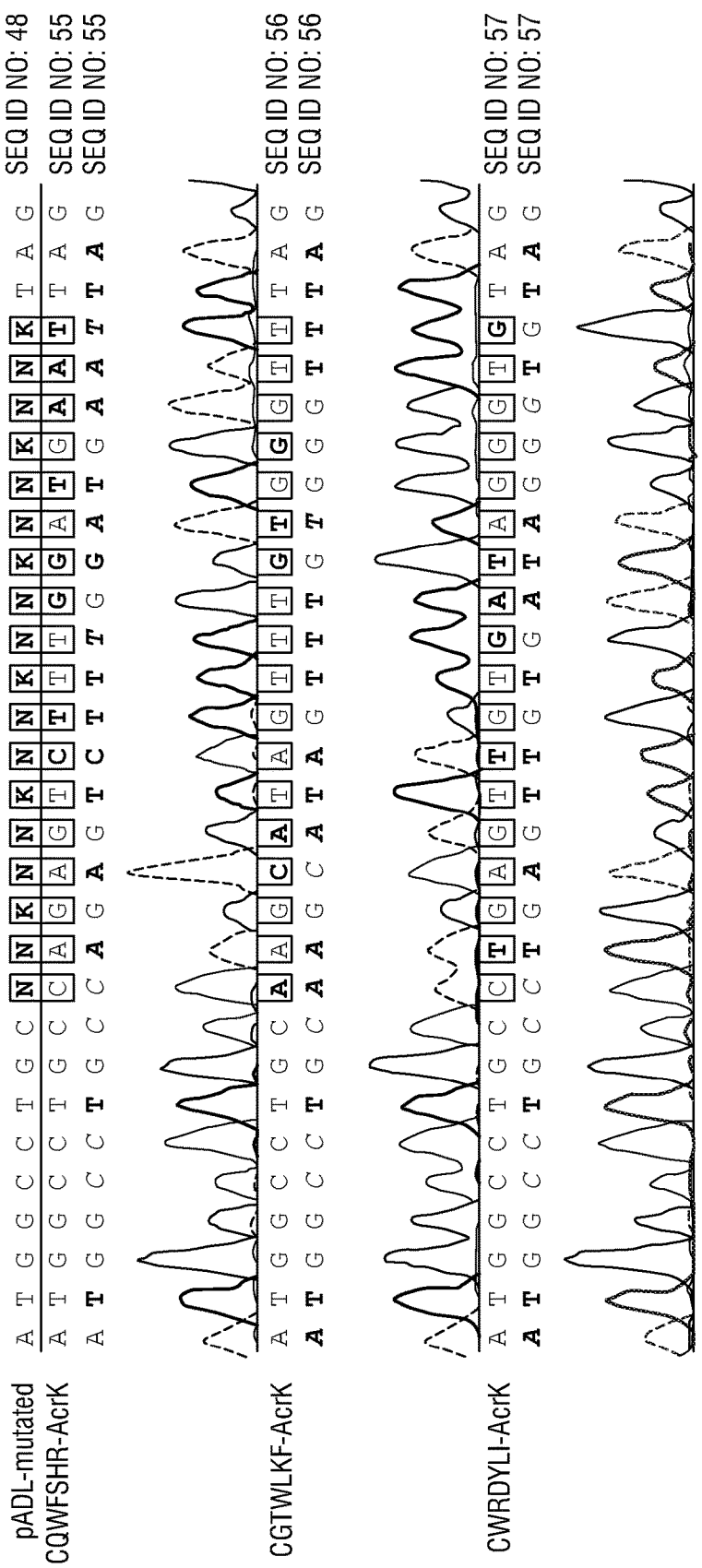
FIG. 8 shows additional DNA sequencing results and their converged peptide sequences of HDAC8-bound clones.

For both TEV protease and HDAC8, Applicants isolated 25 clones selected to bind them for DNA sequencing and their results are presented in FIGS. 7-8.

EXAMPLE 1.12

Synthesis of Selected Peptides

Figure 16:
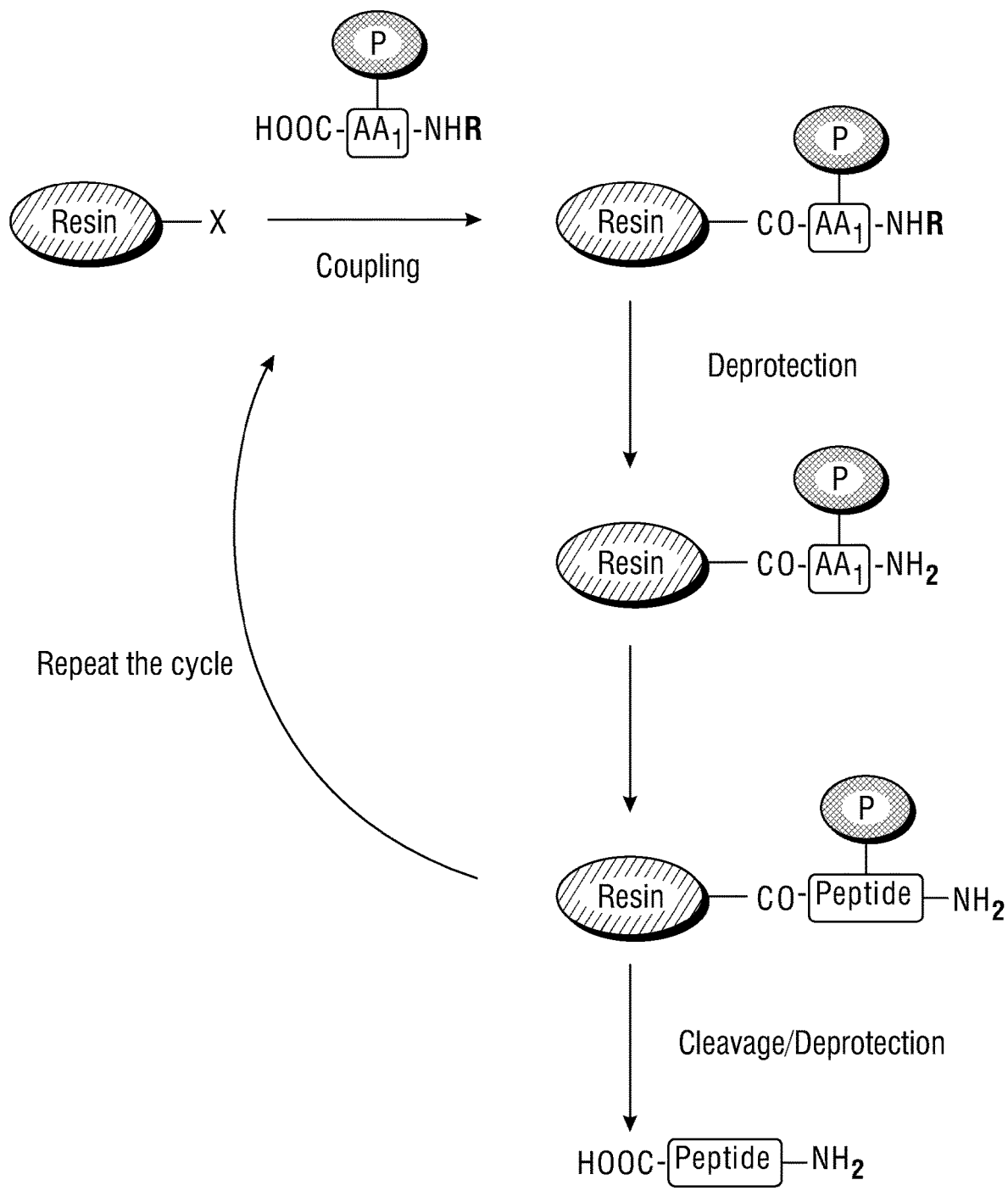
FIG. 16 shows the general procedure of solid-phase peptide synthesis.

Applicants synthesized all peptides from the C-terminus to the N-terminus using the solid-phase peptide synthesis according to FIG. 16. Resins are used to couple amino acids one by one. Applicants used Fmoc-protected amino acids in the synthesis. Coupling of each amino acid to a N-deprotected resin-conjugated peptide to a Fmoc-protected amino acid using an activating coupling reagent typically took about a few minutes to a few hours. Applicants washed unreacted reagents and byproducts by DMF and dichloromethane. Applicants cleaved the finally synthesized peptides from resin using 95% TFA, precipitated them by cold ether, and subjected them to further characterization. To monitor the coupling process, Applicants used the Kaiser test.

For the coupling of the first lysine to the resin, Applicants added 200 mg Rink amide MBHA resin (Novabiochem) in DMF to a poly vessel for swelling for 1 h. Applicants then deprotected the Fmoc group of the resin by providing 20% (v/v) piperidine in DMF for 30 min and subsequently washed the resin with DMF, dichloromethane (DCM) and methanol. Applicants dissolved Fmoc-Lys(mtt)-OH (4 eq.), tetramethyluronium hexafluorophosphate (HBTU, 4 eq.), and diisopropyl-ethylamine (DIEA, 10 eq.) in DMF and then added this solution to the reaction vessel under nitrogen to mix with the resin. Applicants deemed the coupling finished when the Kaiser-ninhydrin test became negative.

For coupling 5-carboxyfluorescein (5-FAM) to the first lysine, Applicants removed the mtt protection group from the first lysine by repeating washing the resin with 1% TFA and 5% triisoproylsilane (TIS) in DCM (v/v). After deprotection, Applicants added 5-FAM (2 eq.) and DIEA (5 eq.) in DMF to the resin and ran the coupling reaction until the Kaiser test became negative.

For coupling the second lysine and the remaining amino acids to the resin, Applicants deprotected the Fmoc group from the resin-conjugated peptides by adding 20% piperidine in DMF for 30 min and subsequently washed the resin with DMF, dichloromethane (DCM) and methanol. Applicants dissolved Fmoc-protected amino acids (4 eq.), tetramethyluronium hexafluorophosphate (HBTU, 4 eq.) and diisopropyl-ethylamine (DIEA, 10 eq.) in DMF (10 mL) and added this solution to the reaction vessel under nitrogen to mix with the resin. Applicants let the reaction continue until the Kaiser-ninhydrin test became negative. For the last amino acid, Applicants used Boc-Cys(trt)-OH. There was no additional deprotection steps after the final coupling.

For the synthesis of N-succinimidyl-acrylate Applicants added N, N-diisopropylethylamine (1.5 mL, 8.9 mmol) to a solution of N-hydroxysuccinimide (1.3 g, 11.3 mmol) in anhydrous dichloromethane (25 mL). This was followed by dropwise addition of acryloyl chloride (0.8 mL, 9.3 mmol) in ice bath. Applicants stirred the mixture for 10 h at r. t. Applicants then extracted the mixture with ethyl acetate, washed with saturated $NH_4Cl$ solution and brine, and dried with anhydrous $MgSO_4$. Applicants filtered the solution and evaporated it under vacuum to give N-succinimidyl-acrylate (1.5 g) as yellow oil. The product was used in the next step without further purification.

For coupling N-succinimidyl-acrylate to the second lysine, Applicants used 1% TFA and 5% triisopropylsilane (TIS) in dichloromethane (v/v) to remove the mtt group after the coupling of cysteine. Applicants then added N-Succinimidyl acrylate (2 eq.) and DIEA (5 eq.) in DMF to the resin and carried out the coupling until Kaiser test became negative.

Figure 17:
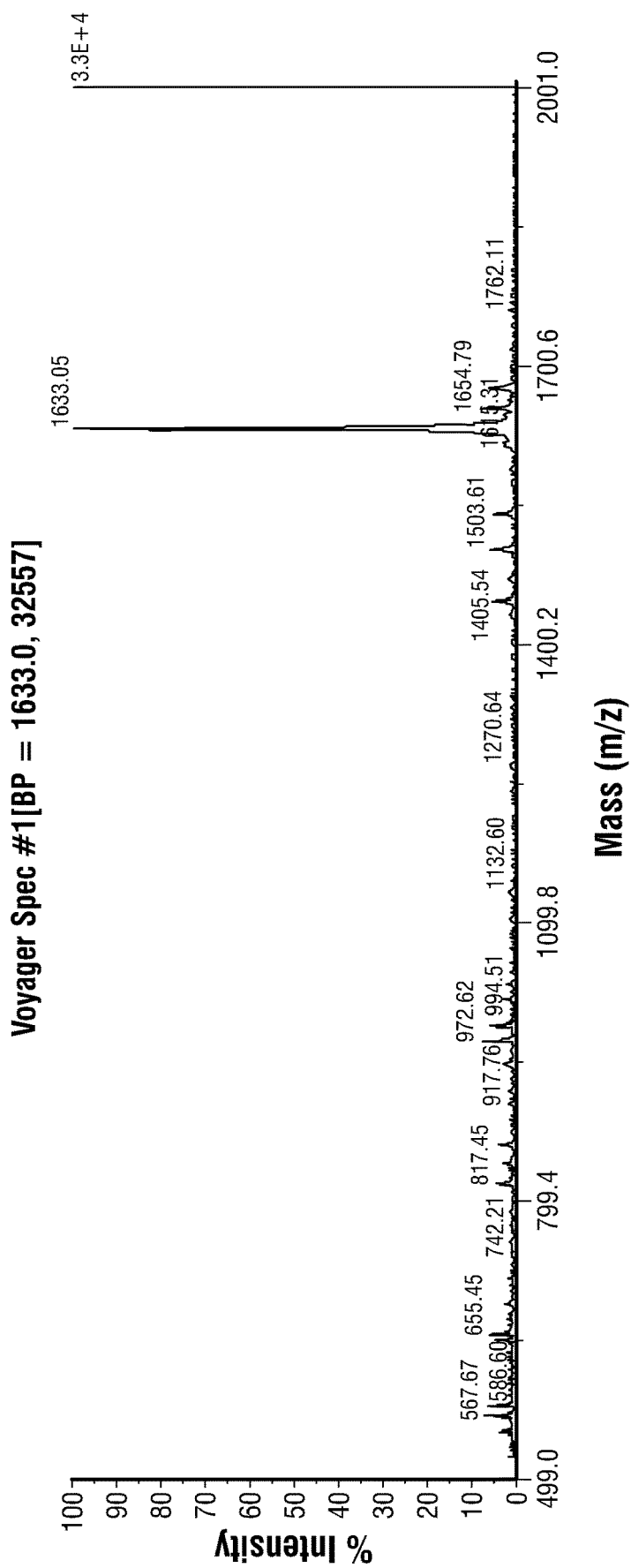
FIG. 17 shows the MALDI-TOF spectrum of CWRDY-LIX-K-5FAM (SEQ ID NO: 1) (calculated molecular weight: 1634.7 Da).
Figure 18:
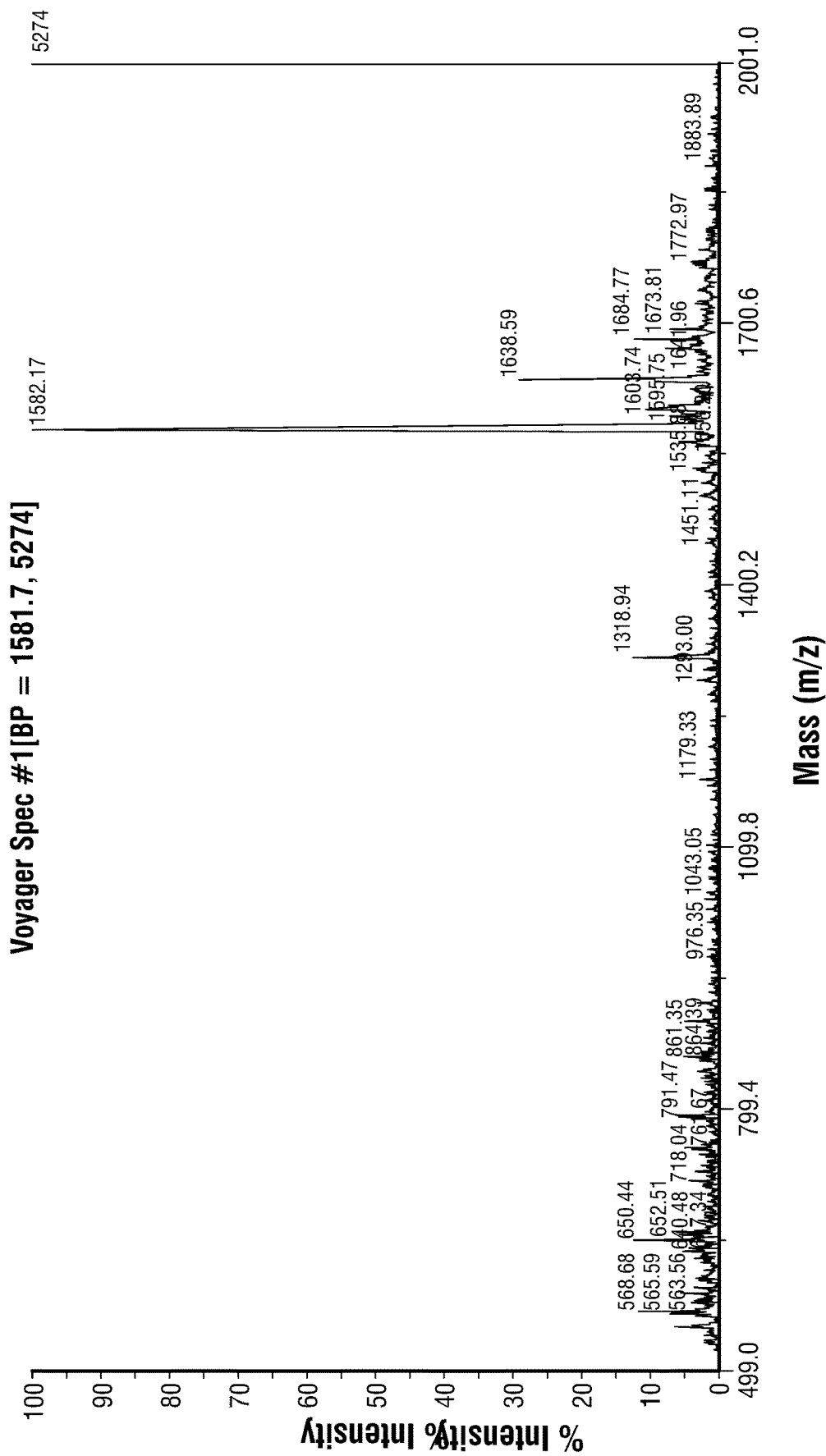
FIG. 18 shows the MALDI-TOF spectrum of CWRDY-LIK-K-5FAM (SEQ ID NO: 4) (calculated molecular weight: 1580.7 Da).
Figure 19:
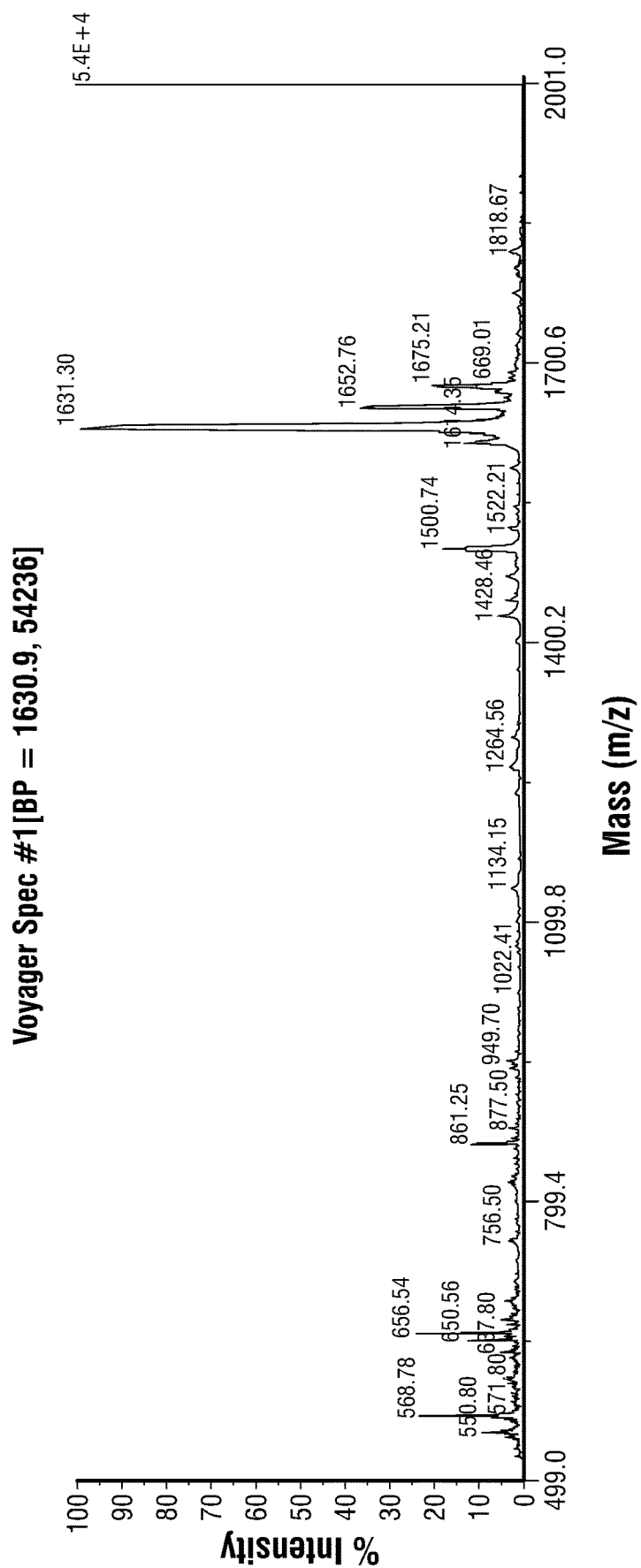
FIG. 19 shows the MALDI-TOF spectrum of CWRDY-LIX-K-5FAM (SEQ ID NO: 1) (calculated molecular weight: 1629.7 Da).

For the cleavage of the peptide from the resin, Applicants incubated 200 mg resins with 4 mL of a cleavage solution containing 92.5% TFA, 2.5% TIS, 2.5% water, and 2.5% 1-Ethyl-3-(3-dimethylaminopropyl)carbodiimide (EDC) for 2-3 hours. The peptide products were then precipitated with 10 volume cold diethyl ether. Applicants collected the cleaved peptides by centrifugation, washed it with cold diethyl ether, and purified it by HPLC. The purified products were lyophilized and subjected to MALDI-TOF analysis (FIGS. 17-19).

To prepare cyclic peptides, Applicants dissolved the purified peptides in a PBS buffer and incubated them at r. t. for 4 h, and then subjected them to HPLC chromatography. Applicants collected the Eluted peptides and lyophilized them to give white powders. The NMR analysis indicated no peaks for alkenyl hydrogens proving the successful cyclization of the side chain of cysteine with the acryloyl moiety of AcrK in these peptides.

EXAMPLE 1.13

Fluorescence Polarization Measurement

Applicants incubated a 25 nM 5-FAM-conjugated cyclic peptide and different concentrations of a target protein (160 nM to 160 μM) in black 96-well plates in a 200 μL total volume that was adjusted by adding a PBS buffer. The fluorescence polarization was measured in a microplate reader at Ex/Em=490 nm/520 nm.

EXAMPLE 1.14

$IC_{50}$ Value Measurements

For the synthesis of Boc-Kac-AMC, Applicants dissolved Boc-Kac-OH (2.0 mmol, 576.7 mg) and 7-Amino-4-methylcoumarin (2.0 mmol, 350.4 mg) in ice-chilled anhydrous THF (50 mL) and then added pyridine (20.0 mmol, 1.6 mL) to the solution dropwise followed by the addition of phosphoryl chloride (8.4 mmol, 0.8 mL). Applicants stirred the mixture in ice-water bath for 3 h and quenched the reaction by the addition of saturated sodium bicarbonate solution (50 mL). Applicants concentrated the mixture to 50 mL under reduced pressure, extracted it with 25 mL dichloromethane for three times, and then washed with 25 mL saturated NaCl solution and 0.5 M HCl solution (4×50 mL). Applicants dried the combined dichloromethane extraction over anhydrous $MgSO_4$, concentrated it under reduced pressure, and dissolved in HCl/MeOH (1:4 v/v). Applicants stirred the solution at r. t. for 24 h and concentrated it under reduced pressure, affording desired product (489.1 mg, 55% for two steps) as a yellow powder.

Scheme 2 illustrates the aforementioned synthesis.

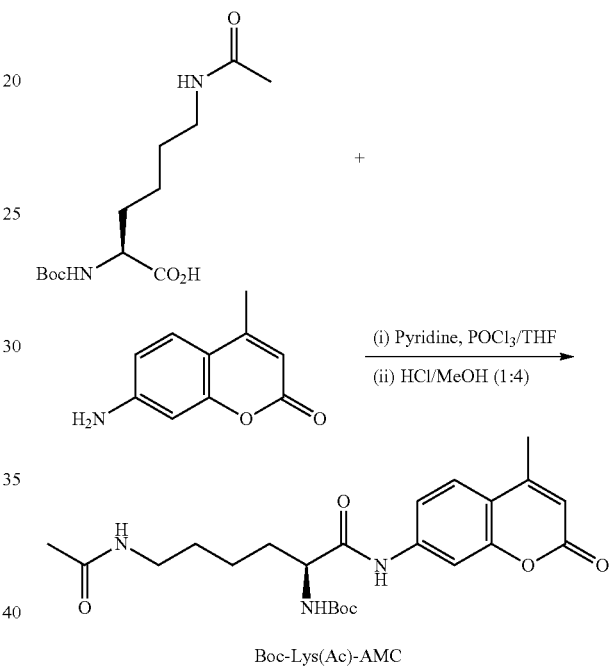

EXAMPLE 1.15

$IC_{50}$ Measurement

Applicants added different concentrations (1 nM-1000 μM) of 5FAM-cycH8a and 5 nM HDAC8 to a black 96-well plate (Pierce) and provided additional PBS buffer to adjust the final volume in each well to be 200 μL. The plate was incubated at 30° C. for 10 min. Next, Applicants added 50 μM Boc-Kac-AMC to each well. After 1 h incubation at 30° C., Applicants provided trichostatin A (TSA, 1 μM) to terminate the HDAC-catalyzed deacetylation followed by the addition of trypsin (0.5 mg/mL) to the reaction solution. After additional 1 h incubation at 30° C., Applicants measured the fluorescence of coumarin in a microplate reader with Ex/Em=360 nm/460 nm. All measurements were repeated three times.

EXAMPLE 1.16

Molecular Docking

The crystal structure of the HDAC8 receptor (PDB code 5FCW) was prepared in monomeric and dimeric forms using Autodock tools. The CycH8a was also prepared as the ligand with the same program. The docking search box was chosen such that it contains the whole protein structure. Docking was performed using Autodock vina and the poses were visualized for analysis using UCSF Chimera.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of selecting cyclic peptides that bind to a desired target, said method comprising:
    (a) transforming a phage display library comprising a plurality of nucleic acids into bacterial host cells,
        wherein the nucleic acids comprise phage coat protein genes comprising a combinatorial region, and
        wherein the combinatorial region encodes at least one cysteine and at least one non-canonical amino acid;
    (b) expressing the phage coat protein genes within the bacterial host cells,
        wherein the bacterial host cells produce phage particles from the nucleic acids,
        wherein the phage particles contain phage coat proteins with the at least one cysteine and the at least one non-canonical amino acid in the combinatorial region, and
        wherein the at least one cysteine and the at least one non-canonical amino acid couple to one another to form a cyclic peptide;
    (c) screening the phage particles against the desired target,
        wherein the screening results in the selection of phage particles with cyclic peptides that bind to the desired target; and
    (d) identifying the amino acid sequences of the cyclic peptides of the selected phage particles.

2. The method of claim 1, wherein the screening occurs by:
    (a) incubating the phage particles with the desired target, wherein the desired target is immobilized on a surface;
    (b) separating unbound phage particles from phage particles that are bound to the desired target; and
    (c) isolating the bound phage particles; and
    wherein the identifying comprises:
    (a) purifying the selected phage particles;
    (b) isolating the nucleic acids from the selected phage particles; and
    (c) sequencing the combinatorial regions of the nucleic acids.

3. The method of claim 1, wherein the screening further comprises:
    (a) transforming the selected phage particles into bacterial host cells to allow for the production of additional phage particles; and
    (b) re-screening the phage particles in accordance with step (b) of claim 1, wherein the further screening is repeated multiple times.

4. The method of claim 1,
    wherein the desired target is selected from the group consisting of peptides, proteins, enzymes, enzymes inhibited by the cyclic peptides, proteases, histone deacetylases, TEV protease, HDAC8, small molecules, cell receptors, antigens, ligand binding sites of a desired target, active sites of a desired target, active sites of a protein, allosteric sites of a protein, DNA, RNA, and combinations thereof,
    wherein the nucleic acids are in the form of phagemids, or wherein the nucleic acids are encapsulated in a phage,
    wherein the bacterial host cells are capable of translating the combinatorial region of the phage coat protein gene such that the at least one cysteine and the at least one non-canonical amino acid are translated, and
    wherein the bacterial host cells are co-infected with a knockout helper phage that does not express the phage coat protein gene.

5. The method of claim 1,
    wherein the at least one non-canonical amino acid is encoded by a codon selected from the group consisting of an in-frame amber codon, an in-frame ochre codon, an in-frame opal codon, a rare codon, and a four base codon,
    wherein the at least one non-canonical amino acid is encoded by an in-frame amber codon,
    wherein the bacterial host cells are an amber-suppressing bacterial host strain,
    wherein the bacterial host cells contain an amber suppressor tRNA that has been aminoacylated with the at least one non-canonical amino acid by a cognate aminoacyl-tRNA synthetase, and
    wherein the at least one non-canonical amino acid is selected from the group consisting of phenylalanine-derived non-canonical amino acids, lysine-derived non-canonical amino acids, non-canonical amino acids comprising an electrophilic moiety that is capable of reacting with the sulfur group of the at least one cysteine, an alkene-containing non-canonical amino acid, an alkyne-containing non-canonical amino acid, an alkyl halide-containing non-canonical amino acid, $N^6$-acryloyllysine (AcrK), and combinations thereof.

6. The method of claim 1,
wherein the phage coat protein gene is the PIII gene, wherein the phage coat protein gene is positioned near an IPTG-inducible promoter, and wherein the phage coat protein is expressed by exposing the bacterial host cells to IPTG.

7. The method of claim 1, wherein the at least one non-canonical amino acid is at one end of the combinatorial region and the at least one cysteine is at the other end of the combinatorial region, wherein the at least one non-canonical amino acid and the at least one cysteine are separated by at least 4 amino acids, and wherein the at least one cysteine and the at least one non-canonical amino acid couple to one another by a Michael addition reaction or a nucleophilic substitution reaction between the at least one cysteine and an electrophilic region of the at least one non-canonical amino acid.

\* \* \* \* \*

SEQUENCE LISTING

```
<160> NUMBER OF SEQ ID NOS: 57

<210> SEQ ID NO 1
<211> LENGTH: 8
<212> TYPE: PRT
<213> ORGANISM: Artificial Sequence
<220> FEATURE:
<223> OTHER INFORMATION: CycTev1
<220> FEATURE:
<221> NAME/KEY: MISC_FEATURE
<222> LOCATION: (8)..(8)
<223> OTHER INFORMATION: X is a non-canonical amino acid

<400> SEQUENCE: 1

Cys Trp Arg Asp Tyr Leu Ile Xaa
1               5

<210> SEQ ID NO 2
<211> LENGTH: 8
<212> TYPE: PRT
<213> ORGANISM: Artificial Sequence
<220> FEATURE:
<223> OTHER INFORMATION: CycTev2
<220> FEATURE:
<221> NAME/KEY: MISC_FEATURE
<222> LOCATION: (8)..(8)
<223> OTHER INFORMATION: X is a non-canonical amino acid

<400> SEQUENCE: 2

Cys Gln Trp Phe Ser His Arg Xaa
1               5

<210> SEQ ID NO 3
<211> LENGTH: 8
<212> TYPE: PRT
<213> ORGANISM: Artificial Sequence
<220> FEATURE:
<223> OTHER INFORMATION: CycH8a
<220> FEATURE:
<221> NAME/KEY: MISC_FEATURE
<222> LOCATION: (8)..(8)
<223> OTHER INFORMATION: X is a non-canonical amino

<400> SEQUENCE: 3

Cys Gln Ser Leu Trp Met Asn Xaa
1               5

<210> SEQ ID NO 4
<211> LENGTH: 8
<212> TYPE: PRT
<213> ORGANISM: Artificial Sequence
<220> FEATURE:
<223> OTHER INFORMATION: LinTev1

<400> SEQUENCE: 4

Cys Trp Arg Asp Tyr Leu Ile Lys
1               5
```

<210> SEQ ID NO 5
<211> LENGTH: 8
<212> TYPE: PRT
<213> ORGANISM: Artificial Sequence
<220> FEATURE:
<223> OTHER INFORMATION: LinTev2

<400> SEQUENCE: 5

Cys Gln Trp Phe Ser His Arg Lys
1               5

<210> SEQ ID NO 6
<211> LENGTH: 8
<212> TYPE: PRT
<213> ORGANISM: Artificial Sequence
<220> FEATURE:
<223> OTHER INFORMATION: LinH8a

<400> SEQUENCE: 6

Cys Gln Ser Leu Trp Met Asn Lys
1               5

<210> SEQ ID NO 7
<211> LENGTH: 759
<212> TYPE: DNA
<213> ORGANISM: Artificial Sequence
<220> FEATURE:
<223> OTHER INFORMATION: CA5X-sfGFP

<400> SEQUENCE: 7

```
atgtgtgctg cagcggctgc atagaaagga gaagaacttt tcactggagt tgtcccaatt      60
cttgttgaat tagatggtga tgttaatggg cacaaatttt ctgtccgtgg agagggtgaa     120
ggtgatgcta caaacggaaa actcacccct taaatttatt tgcactactg gaaaactacct    180 gttccgtggc caacacttgt cactactctg acctatggtg ttcaatgctt ttcccgttat     240
ccggatcaca tgaaacggca tgacttttc aagagtgcca tgcccgaagg ttatgtacag     300
gaacgcacta tatctttcaa agatgacggg acctacaaga cgcgtgctga agtcaagttt     360
gaaggtgata cccttgttaa tcgtatcgag ttaaagggta ttgattttaa agaagatgga    420
aacattcttg gacacaaact cgagtacaac tttaactcac acaatgtata catcacggca     480
gacaaacaaa agaatggaat caaagctaac ttcaaaattc gccacaacgt tgaagatggt    540
tccgttcaac tagcagacca ttatcaacaa atactccaa ttggcgatgg ccctgtcctt     600
ttaccagaca accattacct gtcgacacaa tctgtccttt cgaaagatcc caacgaaaag    660
cgtgaccaca tggtccttct tgagtttgta actgctgctg ggattacaca tggcatggat     720
gagctctaca aaggatccca tcaccatcac catcactaa                            759
```

<210> SEQ ID NO 8
<211> LENGTH: 759
<212> TYPE: DNA
<213> ORGANISM: Artificial Sequence
<220> FEATURE:
<223> OTHER INFORMATION: A6X-sfGFP

<400> SEQUENCE: 8

```
atggctgctg cagcggctgc atagaaagga gaagaacttt tcactggagt tgtcccaatt      60
cttgttgaat tagatggtga tgttaatggg cacaaatttt ctgtccgtgg agagggtgaa     120
ggtgatgcta caaacggaaa actcacccct taaatttatt tgcactactg gaaaactacct    180 gttccgtggc caacacttgt cactactctg acctatggtg ttcaatgctt ttcccgttat     240
```

```
ccggatcaca tgaaacggca tgactttttc aagagtgcca tgcccgaagg ttatgtacag    300
gaacgcacta tatcttccaa agatgacggg acctacaaga cgcgtgctga agtcaagttt    360
gaaggtgata cccttgttaa tcgtatcgag ttaaagggta ttgattttaa agaagatgga    420
aacattcttg acacaaaact cgagtacaac tttaactcac acaatgtata catcacggca    480
gacaaacaaa agaatggaat caaagctaac ttcaaaattc gccacaacgt tgaagatggt    540
tccgttcaac tagcagacca ttatcaacaa aatactccaa ttggcgatgg ccctgtcctt    600
ttaccagaca accattacct gtcgacacaa tctgtccttt cgaaagatcc caacgaaaag    660
cgtgaccaca tggtccttct tgagtttgta actgctgctg ggattacaca tggcatggat    720
gagctctaca aggatccca tcaccatcac catcactaa                            759
```

<210> SEQ ID NO 9
<211> LENGTH: 30
<212> TYPE: PRT
<213> ORGANISM: Artificial Sequence
<220> FEATURE:
<223> OTHER INFORMATION: CA5X-F Primer

<400> SEQUENCE: 9

Gly Ala Gly Ala Thr Ala Thr Ala Cys Cys Ala Thr Gly Thr Gly Thr
1               5                   10                  15

Gly Cys Thr Gly Cys Ala Gly Cys Gly Gly Cys Thr Gly Cys
            20                  25                  30

<210> SEQ ID NO 10
<211> LENGTH: 30
<212> TYPE: PRT
<213> ORGANISM: Artificial Sequence
<220> FEATURE:
<223> OTHER INFORMATION: CA5X-R Primer

<400> SEQUENCE: 10

Gly Cys Ala Gly Cys Cys Gly Cys Thr Gly Cys Ala Gly Cys Ala Cys
1               5                   10                  15

Ala Cys Ala Thr Gly Gly Thr Ala Thr Ala Thr Cys Thr Cys
            20                  25                  30

<210> SEQ ID NO 11
<211> LENGTH: 30
<212> TYPE: PRT
<213> ORGANISM: Artificial Sequence
<220> FEATURE:
<223> OTHER INFORMATION: CA5X-F Primer

<400> SEQUENCE: 11

Gly Ala Gly Ala Thr Ala Thr Ala Cys Cys Ala Thr Gly Gly Cys Thr
1               5                   10                  15

Gly Cys Thr Gly Cys Ala Gly Cys Gly Gly Cys Thr Gly Cys
            20                  25                  30

<210> SEQ ID NO 12
<211> LENGTH: 30
<212> TYPE: PRT
<213> ORGANISM: Artificial Sequence
<220> FEATURE:
<223> OTHER INFORMATION: CA5X-R Primer

<400> SEQUENCE: 12

Gly Cys Ala Gly Cys Cys Gly Cys Thr Gly Cys Ala Gly Cys Ala Gly
1               5                   10                  15

Cys Cys Ala Thr Gly Gly Thr Ala Thr Ala Thr Cys Thr Cys
            20                  25                  30

<210> SEQ ID NO 13
<211> LENGTH: 38
<212> TYPE: PRT
<213> ORGANISM: Artificial Sequence
<220> FEATURE:
<223> OTHER INFORMATION: M13K07g3TAA-F Primer

<400> SEQUENCE: 13

Gly Thr Thr Gly Ala Ala Ala Gly Thr Thr Gly Thr Thr Thr Ala Gly
1               5                   10                  15

Cys Ala Thr Ala Ala Cys Cys Cys Ala Thr Ala Cys Ala Gly Ala
            20                  25                  30

Ala Ala Ala Thr Thr Cys
        35

<210> SEQ ID NO 14
<211> LENGTH: 38
<212> TYPE: PRT
<213> ORGANISM: Artificial Sequence
<220> FEATURE:
<223> OTHER INFORMATION: M13K07TAA-R Primer

<400> SEQUENCE: 14

Gly Ala Ala Thr Thr Thr Thr Cys Thr Gly Thr Ala Thr Gly Gly Gly
1               5                   10                  15

Thr Thr Ala Thr Gly Cys Thr Ala Ala Ala Cys Ala Ala Cys Thr
            20                  25                  30

Thr Thr Cys Ala Ala Cys
        35

<210> SEQ ID NO 15
<211> LENGTH: 46
<212> TYPE: PRT
<213> ORGANISM: Artificial Sequence
<220> FEATURE:
<223> OTHER INFORMATION: pADL-NcoI-Cys-Ala5-TAG-g3-F Primer

<400> SEQUENCE: 15

Gly Cys Thr Thr Cys Cys Ala Thr Gly Gly Cys Cys Thr Gly Cys Gly
1               5                   10                  15

Cys Ala Gly Cys Ala Gly Cys Ala Gly Cys Ala Gly Cys Ala Thr Ala
            20                  25                  30

Gly Gly Cys Gly Gly Cys Gly Ala Ala Ala Gly Cys Gly Gly
        35                  40                  45

<210> SEQ ID NO 16
<211> LENGTH: 23
<212> TYPE: PRT
<213> ORGANISM: Artificial Sequence
<220> FEATURE:
<223> OTHER INFORMATION: pADL-NcoI-Cys-Ala5-TAG-R Primer

<400> SEQUENCE: 16

Gly Cys Thr Thr Cys Cys Ala Thr Gly Gly Cys Cys Gly Gly Cys Thr
1               5                   10                  15

Gly Gly Gly Cys Cys Gly Cys
            20

<210> SEQ ID NO 17

<211> LENGTH: 46
<212> TYPE: PRT
<213> ORGANISM: Artificial Sequence
<220> FEATURE:
<223> OTHER INFORMATION: pADL-NcoI-Ala6-TAG-g3-F Primer

<400> SEQUENCE: 17

Gly Cys Thr Thr Cys Cys Ala Thr Gly Gly Cys Cys Gly Cys Ala Gly
1               5                   10                  15

Cys Ala Gly Cys Ala Gly Cys Ala Gly Cys Ala Gly Cys Ala Thr Ala
                20                  25                  30

Gly Gly Cys Gly Gly Cys Gly Ala Ala Ala Gly Cys Gly Gly
            35                  40                  45

<210> SEQ ID NO 18
<211> LENGTH: 23
<212> TYPE: PRT
<213> ORGANISM: Artificial Sequence
<220> FEATURE:
<223> OTHER INFORMATION: pADL-NcoI-Ala6-TAG-R Primer

<400> SEQUENCE: 18

Gly Cys Thr Thr Cys Cys Ala Thr Gly Gly Cys Cys Gly Gly Cys Thr
1               5                   10                  15

Gly Gly Gly Cys Cys Gly Cys
                20

<210> SEQ ID NO 19
<211> LENGTH: 32
<212> TYPE: PRT
<213> ORGANISM: Artificial Sequence
<220> FEATURE:
<223> OTHER INFORMATION: ColDF-F Primer

<400> SEQUENCE: 19

Thr Thr Gly Gly Cys Gly Cys Gly Cys Cys Cys Ala Ala Ala Thr Ala
1               5                   10                  15

Gly Cys Thr Ala Gly Cys Thr Cys Ala Cys Thr Cys Gly Gly Thr Cys
                20                  25                  30

<210> SEQ ID NO 20
<211> LENGTH: 32
<212> TYPE: PRT
<213> ORGANISM: Artificial Sequence
<220> FEATURE:
<223> OTHER INFORMATION: ColDF-R Primer

<400> SEQUENCE: 20

Thr Gly Thr Thr Cys Cys Thr Ala Gly Gly Ala Thr Ala Ala Ala
1               5                   10                  15

Thr Thr Gly Cys Ala Cys Thr Gly Ala Ala Ala Thr Cys Thr Ala Gly
                20                  25                  30

<210> SEQ ID NO 21
<211> LENGTH: 32
<212> TYPE: PRT
<213> ORGANISM: Artificial Sequence
<220> FEATURE:
<223> OTHER INFORMATION: pEVOL-F Primer

<400> SEQUENCE: 21

Thr Gly Thr Thr Cys Cys Thr Ala Gly Gly Thr Cys Thr Thr Cys Ala
1               5                   10                  15

Ala Ala Thr Gly Thr Ala Gly Cys Ala Cys Cys Thr Gly Ala Ala Gly

<210> SEQ ID NO 22
<211> LENGTH: 31
<212> TYPE: PRT
<213> ORGANISM: Artificial Sequence
<220> FEATURE:
<223> OTHER INFORMATION: pEVOL-R Primer

<400> SEQUENCE: 22

Thr Thr Gly Gly Cys Gly Cys Gly Cys Cys Cys Thr Thr Thr Thr
1               5                   10                  15
Thr Thr Cys Thr Cys Cys Thr Gly Cys Cys Ala Cys Ala Thr Gly
            20                  25                  30

<210> SEQ ID NO 23
<211> LENGTH: 5012
<212> TYPE: DNA
<213> ORGANISM: Artificial Sequence
<220> FEATURE:
<223> OTHER INFORMATION: pADLg3-TGC-(NNK)6-TAG
<220> FEATURE:
<221> NAME/KEY: misc_feature
<222> LOCATION: (3257)..(3258)
<223> OTHER INFORMATION: n is a, c, g, or t
<220> FEATURE:
<221> NAME/KEY: misc_feature
<222> LOCATION: (3260)..(3261)
<223> OTHER INFORMATION: n is a, c, g, or t
<220> FEATURE:
<221> NAME/KEY: misc_feature
<222> LOCATION: (3263)..(3264)
<223> OTHER INFORMATION: n is a, c, g, or t
<220> FEATURE:
<221> NAME/KEY: misc_feature
<222> LOCATION: (3266)..(3267)
<223> OTHER INFORMATION: n is a, c, g, or t
<220> FEATURE:
<221> NAME/KEY: misc_feature
<222> LOCATION: (3269)..(3270)
<223> OTHER INFORMATION: n is a, c, g, or t
<220> FEATURE:
<221> NAME/KEY: misc_feature
<222> LOCATION: (3272)..(3273)
<223> OTHER INFORMATION: n is a, c, g, or t
<220> FEATURE:
<221> NAME/KEY: misc_feature
<222> LOCATION: (4122)..(4141)
<223> OTHER INFORMATION: n is a, g, c, or t; k is g or t

<400> SEQUENCE: 23
gcacttttcg gggaaatgtg cgcggaaccc ctatttgttt attttttctaa atacattcaa    60 atatgtatcc gctcatgaga caataaccct gataaatgct tcaataatat tgaaaaagga   120
agagtatgag tattcaacat ttccgtgtcg cccttattcc cttttttgcg gcattttgcc   180
ttcctgtttt tgctcaccca gaaacgctgg tgaaagtaaa agatgctgaa gatcagttgg   240
gtgcacgagt gggttacatc gaactggatc tcaacagcgg taagatcctt gagagttttc   300
gccccgaaga acgttttcca atgatgagca cttttaaagt tctgctatgt ggcgcggtat   360
tatcccgtat tgacgccggg caagagcaac tcggtcgccg catacactat tctcagaatg   420
acttggttga gtactcacca gtcacagaaa agcatcttac ggatggcatg acagtaagag   480
aattatgcag tgctgccata accatgagtg ataacactgc ggccaactta cttctgacaa   540
cgatcggagg accgaaggag ctaaccgctt ttttgcacaa catgggggat catgtaactc   600
gccttgatcg ttgggaaccg gagctgaatg aagccatacc aaacgacgag cgtgacacca   660
cgatgcctgt agcaatggca acaacgttgc gcaaactatt aactggcgaa ctacttactc   720

```
tagcttcccg gcaacaatta atagactgga tggaggcgga taaagttgca ggaccacttc    780
tgcgctcggc gcttccggct ggctggttta ttgctgataa atctggagcc ggtgagcgtg    840
ggtctcgcgg tatcattgca gcactggggc cagatggtaa gccctcccgt atcgtagtta    900
tctacacgac ggggagtcag gcaactatgg atgaacgaaa tagacagatc gctgagatag    960
gtgcctcact gattaagcat tggtaactgt cagaccaagt ttactcatat atactttaga   1020
ttgatttaaa acttcatttt taatttaaaa ggatctaggt gaagatcctt tttgataatc   1080
tcatgaccaa aatcccttaa cgtgagtttt cgttccactg agcgtcagac cccgtagaaa   1140
agatcaaagg atcttcttga gatcctttt ttctgcgcgt aatctgctgc ttgcaaacaa   1200
aaaaaccacc gctaccagcg gtggtttgtt tgccggatca agagctacca actctttttc   1260
cgaaggtaac tggcttcagc agagcgcaga taccaaatac tgttcttcta gtgtagccgt   1320
agttaggcca ccacttcaag aactctgtag caccgcctac atacctcgct ctgctaatcc   1380
tgttaccagt ggctgctgcc agtggcgata agtcgtgtct taccgggttg gactcaagac   1440
gatagttacc ggataaggcg cagcggtcgg gctgaacggg gggttcgtgc acacagccca   1500
gcttggagcg aacgacctac accgaactga gatacctaca gcgtgagcta tgagaaagcg   1560
ccacgcttcc cgaagggaga aaggcggaca ggtatccggt aagcggcagg gtcggaacag   1620
gagagcgcac gagggagctt ccaggggaa acgcctggta tctttatagt cctgtcgggt   1680
ttcgccacct ctgacttgag cgtcgatttt tgtgatgctc gtcaggggg cggagcctat   1740 ggaaaaacgc cagcaacgcg gcctttttac ggttcctggc cttttgctgg ccttttgctc   1800
acatgacccg acaccatcga atggcgcaaa acctttcgcg gtatggcatg atagcgcccg   1860
gaagagagtc aattcagggt ggtgaatgtg aaaccagtaa cgttatacga tgtcgcagag   1920
tatgccggtg tctcttatca gaccgtttcc cgcgtggtga accaggccag ccacgtttct   1980
gcgaaaacgc gggaaaaagt ggaagcggcg atggcggagc tgaattacat tcccaaccgc   2040
gtggcacaac aactggcggg caaacagtcg ttgctgattg gcgttgccac ctccagtctg   2100
gccctgcacg cgccgtcgca aattgtcgcg gcgattaaat ctcgcgccga tcaactgggt   2160
gccagcgtgg tggtgtcgat ggtagaacga agcggcgtcg aagcctgtaa agcggcggtg   2220
cacaatcttc tcgcgcaacg cgtcagtggg ctgatcatta actatccgct ggatgaccag   2280
gatgccattg ctgtggaagc tgcctgcact aatgttccgg cgttatttct tgatgtctct   2340
gaccagacac ccatcaacag tattattttc tcccatgaag acggtacgcg actgggcgtg   2400
gagcatctgg tcgcattggg tcaccagcaa atcgcgctgt tagcgggccc attaagttct   2460
gtctcggcgc gtctgcgtct ggctggctgg cataaatatc tcactcgcaa tcaaattcag   2520
ccgatagcgg aacgggaagg cgactggagt gccatgtccg gttttcaaca aaccatgcaa   2580
atgctgaatg agggcatcgt tcccactgcg atgctggttg ccaacgatca gatggcgctg   2640
ggcgcaatgc gcgccattac cgagtccggg ctgcgcgttg gtgcggacat ctcggtagtg   2700
ggatacgacg ataccgaaga cagctcatgt tatatcccgc cgttaaccac catcaaacag   2760
gattttcgcc tgctggggca aaccagcgtg gaccgcttgc tgcaactctc tcagggccag   2820
gcggtgaagg gcaatcagct gttgcccgtc tcactggtga aaagaaaaac caccctggcg   2880
cccaatacgc aaaccgcctc tccccgcgcg ttggccgatt cattaatgca gctggcacga   2940
caggtttccc gactggaaag cgggcagtga gcggtacccg ataaaagcgg cttcctgaca   3000
ggaggccgtt ttgttttgca gcccacctca acgcaattaa tgtgagttag ctcactcatt   3060
```

```
aggcacccca ggctttacac tttatgcttc cggctcgtat gttgtgtgga attgtgagcg      3120
gataacaatt tcacacagga aacagctatg accatgatta cgaatttcta gataacgagg      3180
gcaaatcatg aaatacctat tgcctacggc ggccgctgga ttgttattac tcgcggccca      3240
gccggccatg gcctgcnnkn nknnknnkkn knnktagggc ccgggaggcc aaggcggtgg      3300
ttctgagggt ggtggctccc tcgagggcgc gccagccgaa actgttgaaa gttgtttagc      3360
aaaacctcat acagaaaatt catttactaa cgtctggaaa gacgacaaaa ctttagatcg      3420
ttacgctaac tatgagggct gtctgtggaa tgctacaggc gttgtggttt gtactggtga      3480
cgaaactcag tgttacggta catgggttcc tattgggctt gctatccctg aaaatgaggg      3540
tggtggctct gagggtggcg ttctgaggg tggcggttct gagggtggcg gtactaaacc      3600
tcctgagtac ggtgatacac ctattccggg ctatacttat atcaaccctc tcgacggcac      3660
ttatccgcct ggtactgagc aaaaccccgc taatcctaat ccttctcttg aggagtctca      3720
gcctcttaat actttcatgt ttcagaataa taggttccga ataggcagg gtgcattaac      3780
tgtttatacg ggcactgtta ctcaaggcac tgaccccgtt aaaacttatt accagtacac      3840
tcctgtatca tcaaaagcca tgtatgacgc ttactggaac ggtaaattca gagactgcgc      3900
tttccattct ggctttaatg aggatccatt cgtttgtgaa tatcaaggcc aatcgtctga      3960
cctgcctcaa cctcctgtca atgctggcgg cggctctggt ggtggttctg gtggcggctc      4020
tgagggtggc ggctctgagg tggcggttc tgagggtggc ggctctgagg tggcggttc       4080
cggtggcggc tccggttccg gtgattttga ttatgaaaaa atggcaaacg ctaataaggg      4140
ggctatgacc gaaaatgccg atgaaaacgc gctacagtct gacgctaaag gcaaacttga      4200
ttctgtcgct actgattacg gtgctgctat cgatggtttc attggtgacg tttccggcct      4260
tgctaatggt aatggtgcta ctggtgattt tgctggctct aattcccaaa tggctcaagt      4320
cggtgacggt gataattcac ctttaatgaa taatttccgt caatatttac cttctttgcc      4380
tcagtcggtt gaatgtcgcc cttatgtctt tggcgctggt aaaccatatg aattttctat      4440
tgattgtgac aaaataaact tattccgtgg tgtctttgcg tttcttttat atgttgccac      4500
ctttatgtat gtattttcga cgtttgctaa catactgcgt aataaggagt cttaatcaag      4560
ctttaatatt ttgttaaaat tcgcgttaaa ttttttgttaa atcagctcat tttttaacca      4620
ataggccgaa atcggcaaaa tcccttataa atcaaaagaa tagaccgaga tagggttgag      4680
tgttgttcca gtttggaaca agagtccact attaaagaac gtggactcca acgtcaaagg      4740
gcgaaaaacc gtctatcagg gcgatggccc actacgtgaa ccatcaccct aatcaagttt      4800
tttggggtcg aggtgccgta agcactaaa tcggaaccct aaagggagcc ccgatttag      4860
agcttgacgg ggaaagccgg cgaacgtggc gagaaaggaa gggaagaaag cgaaaggagc      4920
gggcgctagg gcgctggcaa gtgtagcggt cacgctgcgc gtaaccacca cacccgccgc      4980
gcttaatgcg ccgctacagg gcgcgtcagg tg                                    5012
```

<210> SEQ ID NO 24
<211> LENGTH: 47
<212> TYPE: PRT
<213> ORGANISM: Artificial Sequence
<220> FEATURE:
<223> OTHER INFORMATION: pADL-F Primer

<400> SEQUENCE: 24

Gly Gly Thr Cys Cys Gly Thr Cys Cys Ala Thr Gly Gly Cys Cys Thr
1               5                   10                  15

Gly Cys Asn Asn Lys Asn Asn Lys Asn Asn Lys Asn Asn
                20              25              30

Lys Asn Asn Lys Thr Ala Gly Gly Gly Cys Cys Gly Gly Gly
        35              40              45

<210> SEQ ID NO 25
<211> LENGTH: 26
<212> TYPE: PRT
<213> ORGANISM: Artificial Sequence
<220> FEATURE:
<223> OTHER INFORMATION: pADL-R Primer

<400> SEQUENCE: 25

Cys Cys Ala Cys Gly Gly Cys Cys Ala Thr Gly Gly Cys Cys Gly Gly
1               5                   10                  15

Cys Thr Gly Gly Gly Cys Cys Gly Cys Gly
            20                  25

<210> SEQ ID NO 26
<211> LENGTH: 35
<212> TYPE: DNA
<213> ORGANISM: Artificial Sequence
<220> FEATURE:
<223> OTHER INFORMATION: Isolated Clone from Phagemid Library
<220> FEATURE:
<221> NAME/KEY: misc_feature
<222> LOCATION: (10)..(27)
<223> OTHER INFORMATION: n is a, g, c, or t; k is g or t

<400> SEQUENCE: 26
atggcctgcn nknnknnknn knnknnktag ggccc                          35

<210> SEQ ID NO 27
<211> LENGTH: 35
<212> TYPE: DNA
<213> ORGANISM: Artificial Sequence
<220> FEATURE:
<223> OTHER INFORMATION: Isolated Clone from Phagemid Library

<400> SEQUENCE: 27
atggcctgct tgtgtttgcc gattacgtag ggccc                          35

<210> SEQ ID NO 28
<211> LENGTH: 35
<212> TYPE: DNA
<213> ORGANISM: Artificial Sequence
<220> FEATURE:
<223> OTHER INFORMATION: Isolated Clone from Phagemid Library

<400> SEQUENCE: 28
atggcctgcg cgcgtccggt ttgtagttag ggccc                          35

<210> SEQ ID NO 29
<211> LENGTH: 35
<212> TYPE: DNA
<213> ORGANISM: Artificial Sequence
<220> FEATURE:
<223> OTHER INFORMATION: Isolated Clone from Phagemid Library

<400> SEQUENCE: 29
atggcctgct ttccggtgtt ttcgggttag ggccc                          35

<210> SEQ ID NO 30
<211> LENGTH: 35
<212> TYPE: DNA
<213> ORGANISM: Artificial Sequence

```
<220> FEATURE:
<223> OTHER INFORMATION: Isolated Clone from Phagemid Library

<400> SEQUENCE: 30
atggcctgcc cttcggctac gattgattag ggccc                              35

<210> SEQ ID NO 31
<211> LENGTH: 35
<212> TYPE: DNA
<213> ORGANISM: Artificial Sequence
<220> FEATURE:
<223> OTHER INFORMATION: Isolated Clone from Phagemid Library

<400> SEQUENCE: 31
atggcctgcg ataggggtag tgggacttag ggccc                              35

<210> SEQ ID NO 32
<211> LENGTH: 35
<212> TYPE: DNA
<213> ORGANISM: Artificial Sequence
<220> FEATURE:
<223> OTHER INFORMATION: Isolated Clone from Phagemid Library

<400> SEQUENCE: 32
atggcctgct ttggtaagta gtggtgttag ggccc                              35

<210> SEQ ID NO 33
<211> LENGTH: 35
<212> TYPE: DNA
<213> ORGANISM: Artificial Sequence
<220> FEATURE:
<223> OTHER INFORMATION: Isolated Clone from Phagemid Library

<400> SEQUENCE: 33
atggcctgct tgtctcggac tagtgagtag ggccc                              35

<210> SEQ ID NO 34
<211> LENGTH: 35
<212> TYPE: DNA
<213> ORGANISM: Artificial Sequence
<220> FEATURE:
<223> OTHER INFORMATION: Isolated Clone from Phagemid Library

<400> SEQUENCE: 34
atggcctgcg ttcttactag ggtgccgtag ggccc                              35

<210> SEQ ID NO 35
<211> LENGTH: 35
<212> TYPE: DNA
<213> ORGANISM: Artificial Sequence
<220> FEATURE:
<223> OTHER INFORMATION: Isolated Clone from Phagemid Library

<400> SEQUENCE: 35
atggcctgcc ctggtcatcg ggtttggtag ggccc                              35

<210> SEQ ID NO 36
<211> LENGTH: 35
<212> TYPE: DNA
<213> ORGANISM: Artificial Sequence
<220> FEATURE:
<223> OTHER INFORMATION: Isolated Clone from Phagemid Library

<400> SEQUENCE: 36
atggcctgcc tgggtgttac tcatgcgtag ggccc                              35
```

```
<210> SEQ ID NO 37
<211> LENGTH: 35
<212> TYPE: DNA
<213> ORGANISM: Artificial Sequence
<220> FEATURE:
<223> OTHER INFORMATION: Isolated Clone from Phagemid Library

<400> SEQUENCE: 37
atggcctgcc ttgtttatat ttggggttag ggccc                          35

<210> SEQ ID NO 38
<211> LENGTH: 35
<212> TYPE: DNA
<213> ORGANISM: Artificial Sequence
<220> FEATURE:
<223> OTHER INFORMATION: Isolated Clone from Phagemid Library

<400> SEQUENCE: 38
atggcctgcg tgggtcgtta gcggtattag ggccc                          35

<210> SEQ ID NO 39
<211> LENGTH: 35
<212> TYPE: DNA
<213> ORGANISM: Artificial Sequence
<220> FEATURE:
<223> OTHER INFORMATION: Isolated Clone from Phagemid Library

<400> SEQUENCE: 39
atggcctgct ttaatgggca tccttggtag ggccc                          35

<210> SEQ ID NO 40
<211> LENGTH: 35
<212> TYPE: DNA
<213> ORGANISM: Artificial Sequence
<220> FEATURE:
<223> OTHER INFORMATION: Isolated Clone from Phagemid Library

<400> SEQUENCE: 40
atggcctgcc ttggtattgt ttcgccgtag ggccc                          35

<210> SEQ ID NO 41
<211> LENGTH: 35
<212> TYPE: DNA
<213> ORGANISM: Artificial Sequence
<220> FEATURE:
<223> OTHER INFORMATION: Isolated Clone from Phagemid Library

<400> SEQUENCE: 41
atggcctgct gtgttatggt gtgtttgtag ggccc                          35

<210> SEQ ID NO 42
<211> LENGTH: 35
<212> TYPE: DNA
<213> ORGANISM: Artificial Sequence
<220> FEATURE:
<223> OTHER INFORMATION: Isolated Clone from Phagemid Library

<400> SEQUENCE: 42
atggcctgcg ttaggtattc tgatgtttag ggccc                          35

<210> SEQ ID NO 43
<211> LENGTH: 26
<212> TYPE: DNA
<213> ORGANISM: Artificial Sequence
<220> FEATURE:
<223> OTHER INFORMATION: Isolated Clone from Phagemid Library
```

```
<400> SEQUENCE: 43
atggccgcgg cgaaagcggc cggccc                                          26

<210> SEQ ID NO 44
<211> LENGTH: 17
<212> TYPE: DNA
<213> ORGANISM: Artificial Sequence
<220> FEATURE:
<223> OTHER INFORMATION: Isolated Clone from Phagemid Library

<400> SEQUENCE: 44
atggcggggt agggccc                                                    17

<210> SEQ ID NO 45
<211> LENGTH: 34
<212> TYPE: DNA
<213> ORGANISM: Artificial Sequence
<220> FEATURE:
<223> OTHER INFORMATION: Isolated Clone from Phagemid Library

<400> SEQUENCE: 45
atggcctgct tggtggtctt gggagttaag gccc                                 34

<210> SEQ ID NO 46
<211> LENGTH: 26
<212> TYPE: DNA
<213> ORGANISM: Artificial Sequence
<220> FEATURE:
<223> OTHER INFORMATION: Isolated Clone from Phagemid Library

<400> SEQUENCE: 46
atggccgcgg cgaaagcggc cggccc                                          26

<210> SEQ ID NO 47
<211> LENGTH: 7
<212> TYPE: PRT
<213> ORGANISM: Artificial Sequence
<220> FEATURE:
<223> OTHER INFORMATION: Peptide

<400> SEQUENCE: 47

Cys Gly Thr Trp Leu Lys Phe
1               5

<210> SEQ ID NO 48
<211> LENGTH: 30
<212> TYPE: DNA
<213> ORGANISM: Artificial Sequence
<220> FEATURE:
<223> OTHER INFORMATION: pADL-mutated
<220> FEATURE:
<221> NAME/KEY: misc_feature
<222> LOCATION: (10)..(29)
<223> OTHER INFORMATION: n is a, g, c, or t; k is g or t

<400> SEQUENCE: 48
atggcctgcn nknnknnknn knnknnktag                                      30

<210> SEQ ID NO 49
<211> LENGTH: 30
<212> TYPE: DNA
<213> ORGANISM: Artificial Sequence
<220> FEATURE:
<223> OTHER INFORMATION: CQWFSHR-AcrK

<400> SEQUENCE: 49
```

```
atggcctgcc agtggtttag tcatcgttag                                    30
```

<210> SEQ ID NO 50
<211> LENGTH: 30
<212> TYPE: DNA
<213> ORGANISM: Artificial Sequence
<220> FEATURE:
<223> OTHER INFORMATION: CGTWLKF-AcrK

<400> SEQUENCE: 50

```
atggcctgcg ggacttggct gaagttttag                                    30
```

<210> SEQ ID NO 51
<211> LENGTH: 30
<212> TYPE: DNA
<213> ORGANISM: Artificial Sequence
<220> FEATURE:
<223> OTHER INFORMATION: CWRDYLI-AcrK

<400> SEQUENCE: 51

```
atggcctgct ggcgtgatta tcttatttag                                    30
```

<210> SEQ ID NO 52
<211> LENGTH: 30
<212> TYPE: DNA
<213> ORGANISM: Artificial Sequence
<220> FEATURE:
<223> OTHER INFORMATION: DNA Sequence

<400> SEQUENCE: 52

```
atggcctgcc ggcgttgtaa tcatatttag                                    30
```

<210> SEQ ID NO 53
<211> LENGTH: 7
<212> TYPE: PRT
<213> ORGANISM: Artificial Sequence
<220> FEATURE:
<223> OTHER INFORMATION: Peptide

<400> SEQUENCE: 53

Cys Lys His Ser Leu Trp Val
1               5

<210> SEQ ID NO 54
<211> LENGTH: 7
<212> TYPE: PRT
<213> ORGANISM: Artificial Sequence
<220> FEATURE:
<223> OTHER INFORMATION: Peptide

<400> SEQUENCE: 54

Cys Leu Ser Asp Cys Arg Val
1               5

<210> SEQ ID NO 55
<211> LENGTH: 30
<212> TYPE: DNA
<213> ORGANISM: Artificial Sequence
<220> FEATURE:
<223> OTHER INFORMATION: CQSLWMN-AcrK

<400> SEQUENCE: 55

```
atggcctgcc agagtctttg gatgaattag                                    30
```

<210> SEQ ID NO 56

```
<211> LENGTH: 30
<212> TYPE: DNA
<213> ORGANISM: Artificial Sequence
<220> FEATURE:
<223> OTHER INFORMATION: CKHSLWV-AcrK

<400> SEQUENCE: 56
atggcctgca agcatagttt gtgggtttag                                       30

<210> SEQ ID NO 57
<211> LENGTH: 30
<212> TYPE: DNA
<213> ORGANISM: Artificial Sequence
<220> FEATURE:
<223> OTHER INFORMATION: CLSCDRV-AcrK

<400> SEQUENCE: 57
atggcctgcc tgagttgtga tagggtgtag                                       30
```